United States Patent Office 3,264,237
Patented August 2, 1966

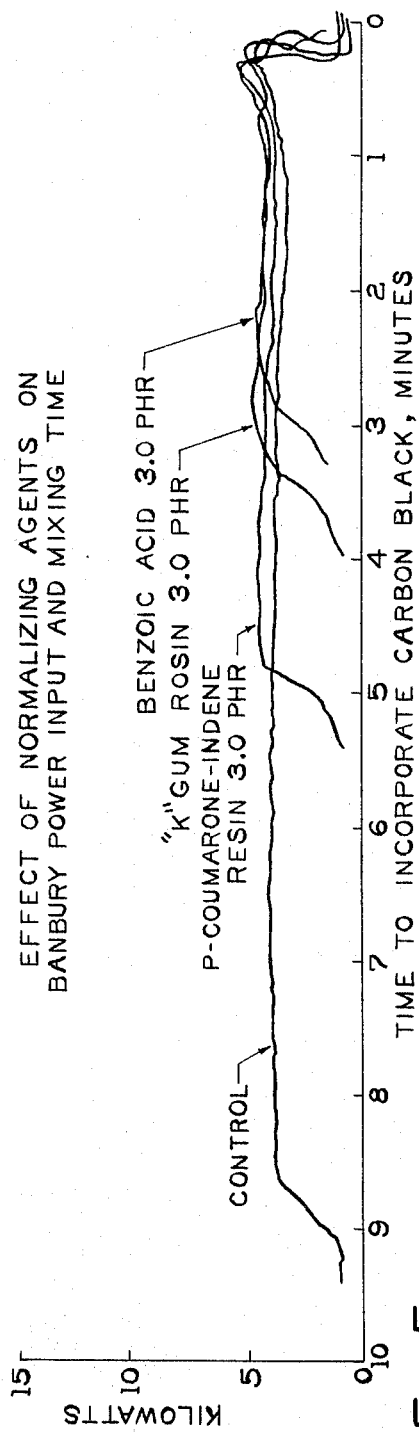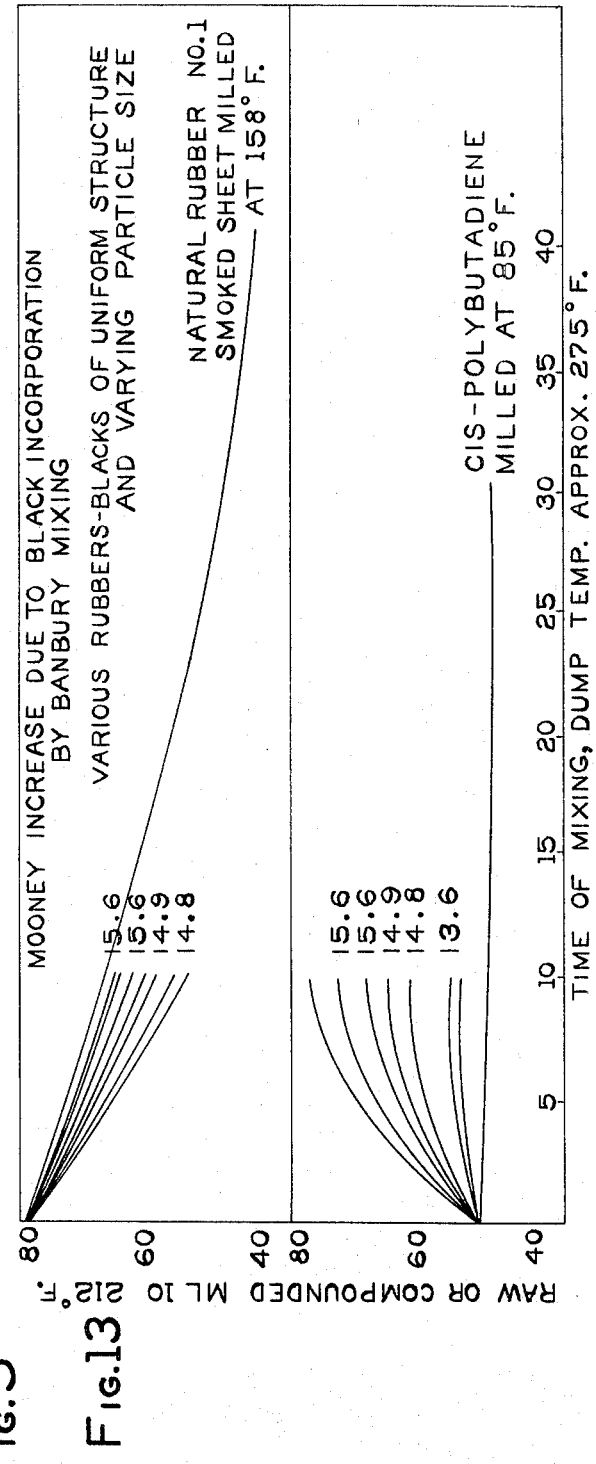

3,264,237
MODIFICATION OF CIS-POLYBUTADIENE WITH A HYDROCARBON OIL, A FATTY ACID AND A TACKIFIER
Donald V. Sarbach, Hinckley, Robert J. Ettinger, Cleveland, Joseph Hugh Macey, Akron, and J. C. Gipson, Lorain, Ohio, assignors to Goodrich-Gulf Chemicals, Inc., a corporation of Delaware
Filed Sept. 28, 1960, Ser. No. 59,072
6 Claims. (Cl. 260—23.7)

The present invention relates generally to the processing of cis-1,4 polybutadiene rubbers and the production of improved vulcanized products containing such rubbers. More specifically, the present invention relates to a method of "normalizing" the processing and vulcanizing behavior of the cis-polybutadiene rubbers; to normalized, thermoplastic compositions containing such cis-polybutadiene rubbers; and to new and novel vulcanized products containing, as the sole rubber hydrocarbon constituent, normalized cis-polybutadiene rubbers.

New catalyst systems have provided an entire family of new diene rubbers which are stereoregular forms of polymized conjugated alkadienes. One of these new stereoregular rubbers is an essentially all cis-1,4 polyisoprene which has a structure essentially duplicating that of the natural (Hevea) rubber molecule. So similar is this synthetic material to its naturally-occurring counterpart that the processing, compounding and vulcanization of the synthetic requires but minor adjustments in the use of natural rubber processing equipment and in natural rubber compounding and processing techniques.

Not so, however, with the synthetic, rubbery, essentially all cis-1,4 polybutadiene (referred to hereinafter simply as cis-polybutadiene rubber). The latter, in its "as made" condition, is deceptively rubbery in appearance. It is a tough, readily stretchable, and often somewhat "tacky" appearing material which one would think would be easily processable. However, when this apparently rubbery material is subjected to mechanical working in the raw state, the material whitens and evidences most peculiar rheological behavior and poor processing qualities. The cis-polybutadiene rubbers behave quite unlike any other known rubbery material during the various rubber processing operations. In FIGS. 2, 4a and 4b of the drawings the abnormally long time for black incorporation is graphically portrayed. Note also that the higher the cis content the shorter the time for black incorporation.

The milling behavior of the cis-polybutadiene rubber is found to be acutely sensitive to the temperature of milling because of pronounced temperature-induced phase changes occurring in the rubber. For this reason cis-polybutadiene rubbers have been processed "cold" rather than "hot" as are other rubbers. When milled with carbon black at mill roll temperatures of 50–55° F., the stock has a dull black appearance, it is "nervy," rough and grainy, and it forms a wavy sheet on the mill. Similarly, at roll temperatures in the range of 80–90° F., the stock appears to melt or soften and acqures a very smooth, shiny black appearance (the appearance is deceiving, however, good black dispersion is not obtained). As the mill roll temperatures are further increased to 120–130° F. or slightly higher, the stock begins to crumble and "bag" away from the rolls and is impossible to handle in this condition. The milling behavior of the stock becomes progressively worse as the mill roll temperatures are increased up to about 180° F. At the latter temperatures or slightly higher, the stock smoothes out again forming a sheet on the mill having little strength and which behaves more like a weak plastic than a rubber. When the mill rolls are gradually cooled down again the described phase changes occur in reverse order and at about the same temperatures.

Examination of vulcanizable compositions of cis-polybutadiene rubber and vulcanizates thereof, prepared by mill mixing at each of 55° F., 90° F., 100° F., and 230° F., indicates that as the temperature of milling increases:

(1) The cure rates of all compositions were much lower than corresponding compositions of natural rubber and SBR, irrespective of the temperature of milling;
(2) The percent carbon gel decreases, suggesting less polymer-to-black contact and more flocculation of the carbon black particles at the higher milling temperatures;
(3) Less breakdown of the rubber at temperatures above 80°–90° F., the breakdown being in all cases, irrespective of temperature, less than is obtained with natural rubber and SBR;
(4) The Mooney viscosity of the vulcanizable compositions increases with increasing temperature of milling, also indicating poorer carbon black dispersion;
(5) The stress-strain properties of the vulcanizates become poorer, also indicating poorer carbon black dispersion with increasing temperatures of milling;
(6) The hardness of the vulcanizates increases by a large factor, also indicating poorer carbon black dispersion at the higher temperatures of milling;
(7) The percent resilience values of the vulcanizates decrease progressively with increased temperatures of milling;
(8) The Goodrich Flexometer heat rise values (55 lbs. at 212° F.) increase progressively with temperature of milling; and
(9) The electrical resistivity values of the vulcanizates increase progressively with the temperature of milling, resistivity values sufficiently high being obtained in compositions prepared at 230° F. as to constitute the vulcanizate an antistatic composition.

It is further observed that, irrespective of the temperature of milling, the compounded compositions extrude very poorly. Dispersion of carbon black also is poor, irrespective of the temperature of milling. It is interesting to note that variations in the temperature of mixing in a Banbury, in the range of 280° to 370° F., produce very little change in vulcanizate characteristics although Banbury mixing times are quite long, the resulting compositions are slow to cure, and good physical properties, and good extrusion qualities, are not obtained.

The rubbery cis-polybutadienes in which 80% or more of the butadiene units are united cis-1,4 are a family of related polymers whose principal properties appear to be directly proportional to the cis-1,4 structural content. These same polymers have certain characteristics in common which are believed responsible for the above-described abnormal processing behavior. First, the raw cis-polybutadiene rubber has a higher Mooney viscosity (ML–4–212° F.) for a given molecular weight than is observed for natural rubber and SBR. Secondly, these cis-polybutadiene rubbers break down (or plasticate) at a rate much below that of natural rubber and SBR. Thirdly, and the characteristic having the most bearing on the processing quality of the rubber, is the relatively larger increase in compounded Mooney viscosity (ML–10–212° F.) incurred by the cis-polybutadiene rubber upon the incorporation of carbon black, as compared to that incurred by natural rubber or SBR. FIG. 13 of the drawings shows this characteristic. The upper curves in FIG. 13 are plots of Mooney viscosity of natural rubber when mixed in a Banbury mixer with various carbon blacks having differing particle size. The number opposite each curve is the specific area of the carbon black utilized in square meters per gram. The mill breakdown curve (at 158° F.) of raw natural rubber (no black) is included as a reference. Note that for natural rubber the compounded Mooney viscosities are all below the mill breakdown curve, an indication that addition of carbon black improves the processability of natural rubber. The situation is reversed for the cis-polybutadiene rubber for the compounded Mooney curves are all above the mill breakdown curve (at 80° F.) for the raw rubber. The latter results indicate poor processing qualities for raw cis-polybutadiene rubbers.

These three inherent characteristics have made it all but impossible satisfactorily to process the higher molecular weight versions of the cis-polybutadiene rubbers. Even the very low Mooney grades (35–45 ML) of cis-polybutadiene rubber are not susceptible of processing by the techniques conventionally employed for natural rubber and SBR.

Processing of a raw cis-polybutadiene rubber at high temperatures by Banbury mixing is also impractical. Raw cis-polybutadiene rubber becomes weak and crumbly at Banbury mixing temperatures and the mixer can exert relatively little shear on the rubber. Unlike other rubbers, increased proportions of carbon black do not toughen the rubber in the Banbury, rather with cis-polybutadiene rubber the larger the proportion of carbon black the poorer the mixing. FIG. 3 of the drawings shows this effect. In FIG. 3, the power consumed by the Banbury drive motor is plotted against time of mixing. Note that the power consumption is lower with the increased proportions of carbon black and, irrespective of the proportion of black, the power curve does not rise to a plateau (usually interpreted as indicating complete dispersion of the carbon black).

The above-described abnormal processing behavior of the rubbery cis-polybutadienes can be overcome to some extent by either or both of two expedients: (1) blending the rubbery cis-polybutadiene with natural rubber or (2) mixing the cis-polybutadiene with high loadings of both carbon black and softener oils.

Natural rubber can be blended satisfactorily only with low molecular weight versions (30–45 ML) of cis-polybutadiene rubber. The reasons for this are: (1) the viscosity of the two rubbers must be about equal for proper blending and (2) since there is such a wide discrepancy in the rate of breakdown of the two rubbers, one must start with a very soft cis-polybutadiene rubber or the natural rubber will be too soft before blending is accomplished. At least 10 parts by weight of natural rubber per 100 parts by weight (PHR) of the cis-polybutadiene rubber must be utilized for processing improvement and, preferably, 25 to 75 PHR are required for really good processing. Most of the physical properties of the resulting co-vulcanizates are, however, intermediate of those of the individual rubbers, except that (1) the abrasion resistance of the co-vulcanizates drops off very rapidly with increasing additions of natural rubber and (2) the resistance to flex cracking of the co-vulcanizates is very poor. It has been found that natural rubber is insoluble in cis-polybutadiene rubber in all proportions at ordinary temperatures and this may account for the poor resistance to cracking in tire treads made of the blended and co-vulcanized materials. SBR is to be avoided as a blending agent with cis-polybutadiene rubbers because the properties of the resulting co-vulcanizates are much poorer than those of either of the individual rubbers.

Blending of natural rubber with cis-polybutadiene rubber destroys the regularity of structure of the rubber so necessary for optimum properties. Processing ease seems to be achieved with natural rubber at too great a price in vulcanizate quality. By this approach, the cis-polybutadiene rubbers become mere extenders for natural rubber and not a superior replacement therefor.

The addition of high loadings both of carbon black (50–75 PHR) and aromatic petroleum hydrocarbon softener oils (30–60 PHR) improves the processing of the cis-polybutadiene rubbers to some degree but at too high a cost in vulcanizate quality. Abrasion resistance drops very rapidly with increased loadings and this result has been confirmed by poor tread wear measurements on tires having treads made from these compositions. In addition, with increasing black and oil loadings the modulus and Goodrich Flexometer heat rise values sharply increase, indicating limited utility of the highly loaded compositions in tire manufacture.

It is among the objects of this invention, therefore, to provide a method of processing the cis-polybutadiene rubbers wherein the cis-polybutadiene rubber is utilized as a superior replacement for natural rubber.

Another object is to provide vulcanizable compositions of superior processing qualities in which a cis-polybutadiene rubber is the only rubber hydrocarbon constituent.

Another object is to provide cis-polybutadiene rubber compositions in which carbon black and other compounding ingredients are well dispersed and which vulcanize at good rates to form vulcanizates of superior quality.

Still another object is to provide vulcanizates in which cis-polybutadiene rubber is the only rubber hydrocarbon and which have optimum properties including specifically high abrasion resistance and low heat generation on flexing.

Yet another object is to provide novel and outstandingly useful heavy duty tires having treads of vulcanized cis-polybutadiene rubber which perform progressively better, as the severity of service increases.

Another important object is to provide a method of processing, compounding and vulcanizing cis-polybutadiene rubbers, which method can be carried out, preferably at 150 to 400° F., in conventional rubber processing equipment with readily available, inexpensive ingredients, and which method produces vulcanizable compositions composed of cis-polybutadiene rubber which can be calendered and extruded with great ease.

Figure 2:
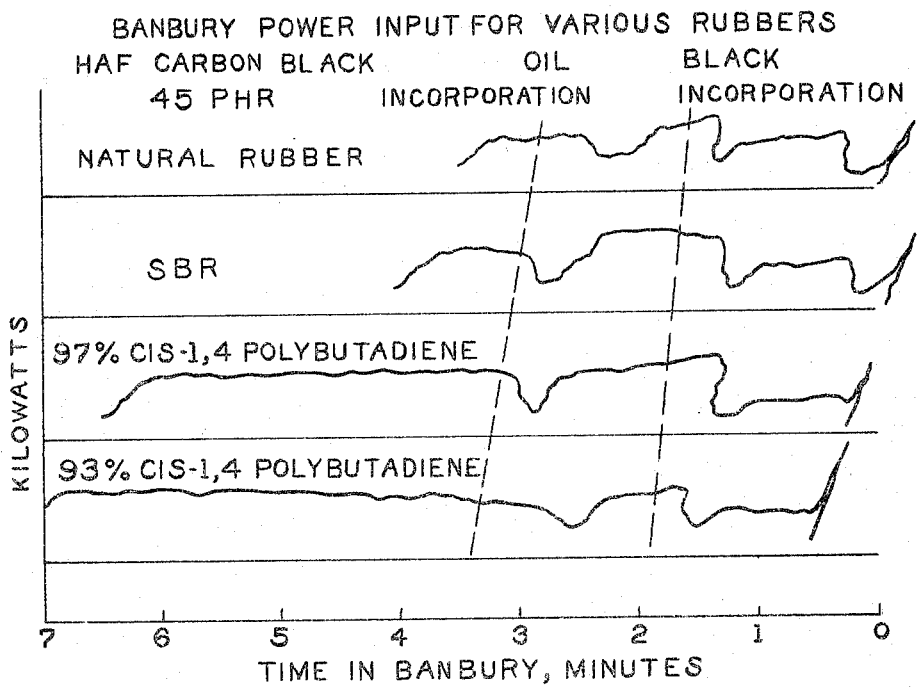
FIG. 2 is a comparison wherein the Banbury power consumption in kilowatts is plotted against time of mixing in minutes; separate curves being shown for each of natural rubber, SBR, and two cis-polybutadiene rubbers of differing cis-1,4 structural content, these curves being obtained when the accepted Banbury mixing technique of adding first carbon black and then softener oils is utilized.
Figure 3:
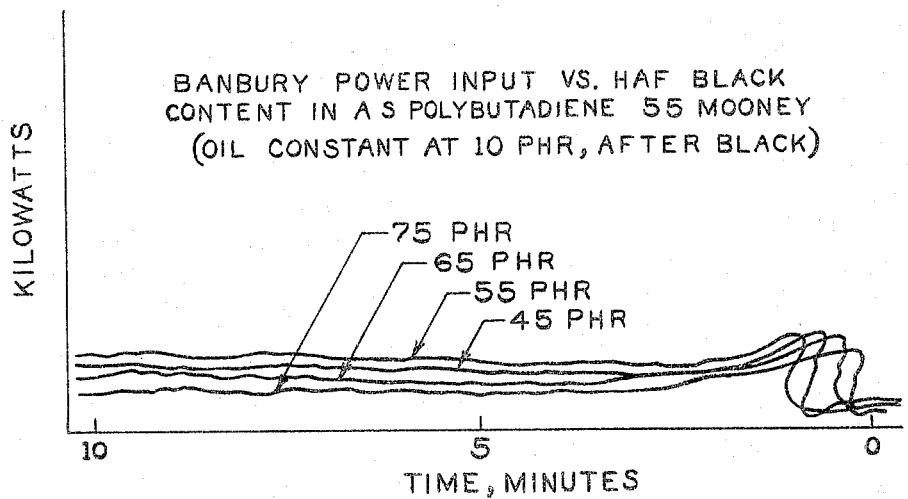
Figure 4B:
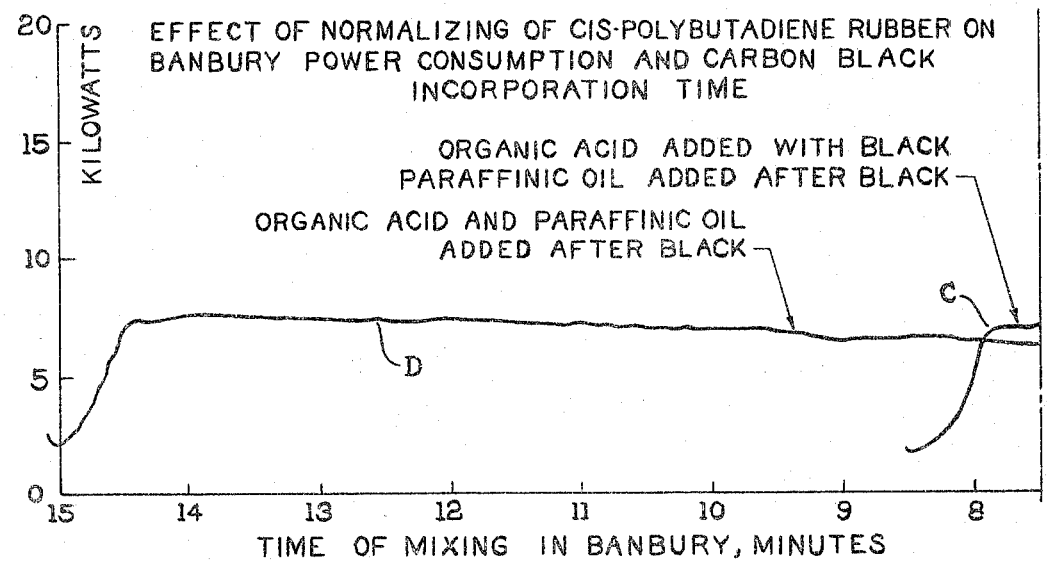
Figure 4A:
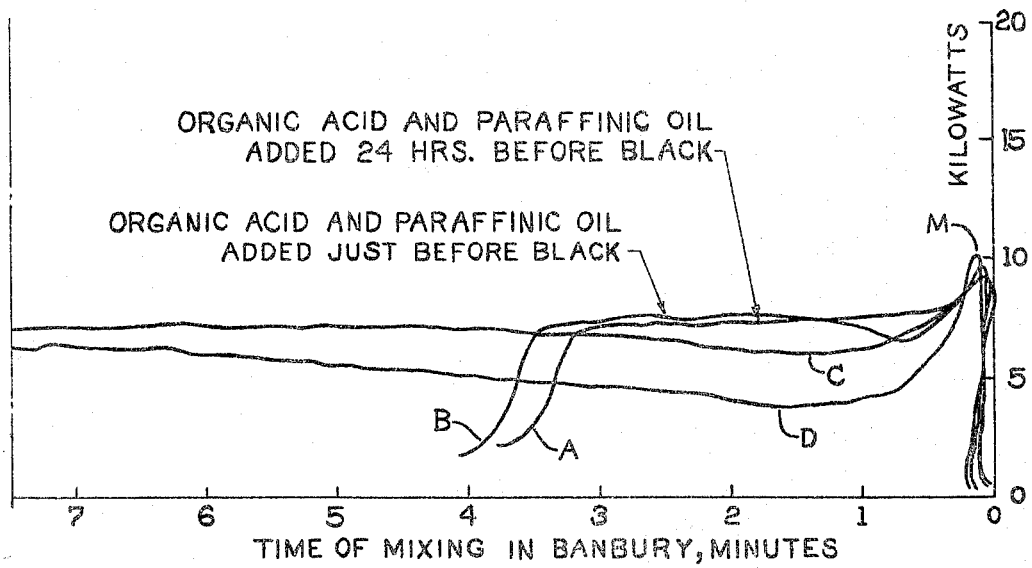
Figure 6:
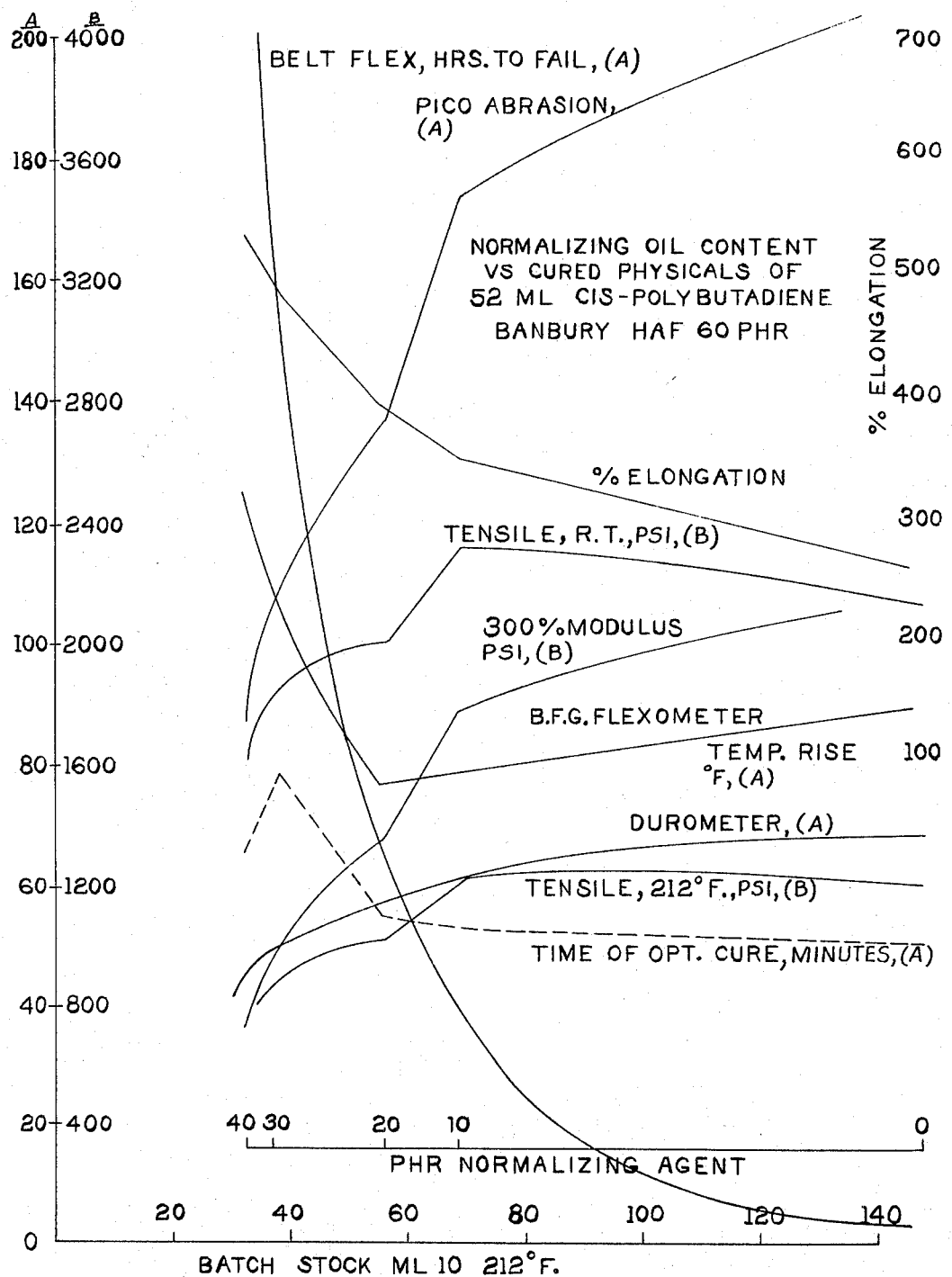
Figure 7:
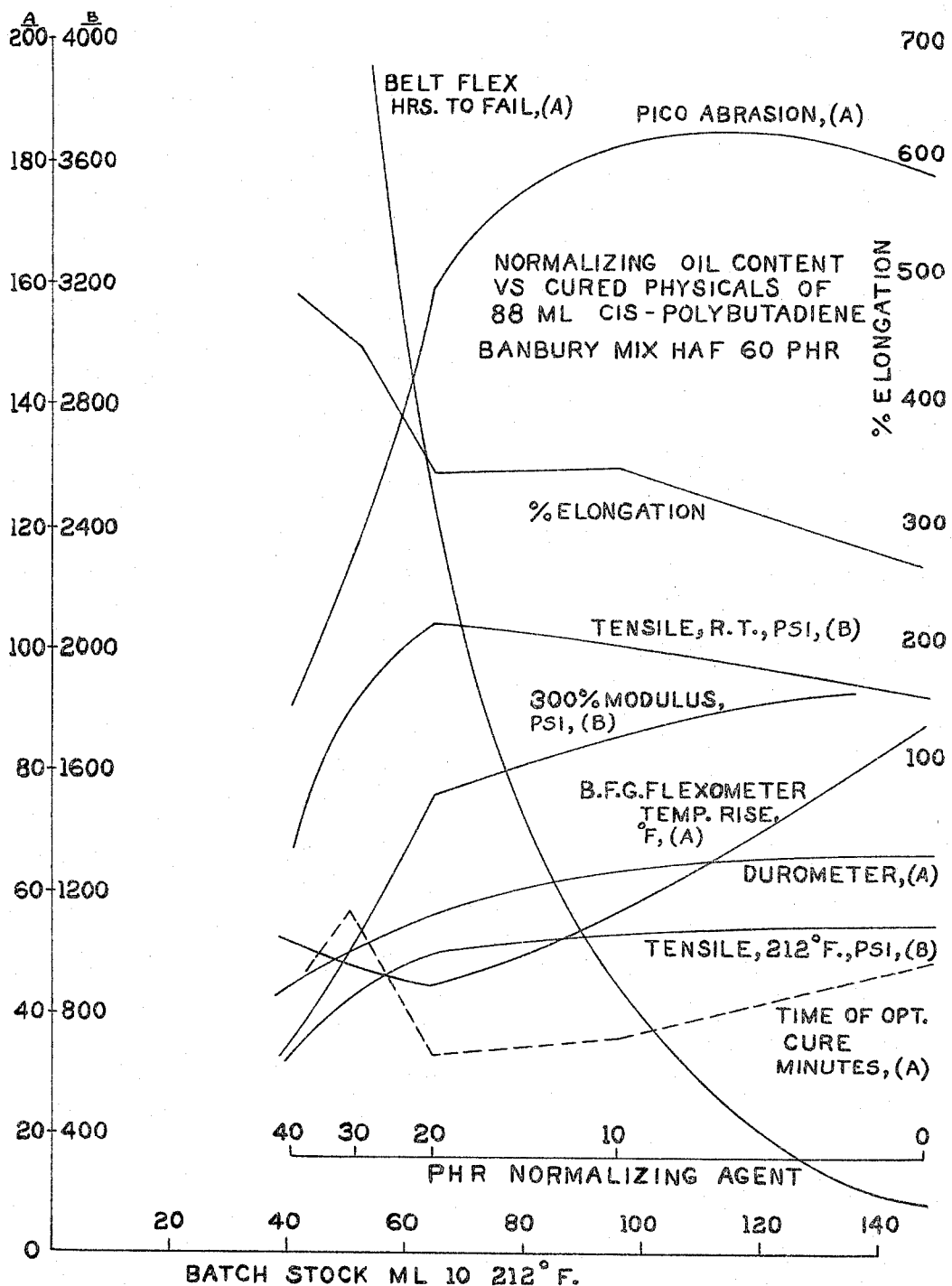
Figure 8:
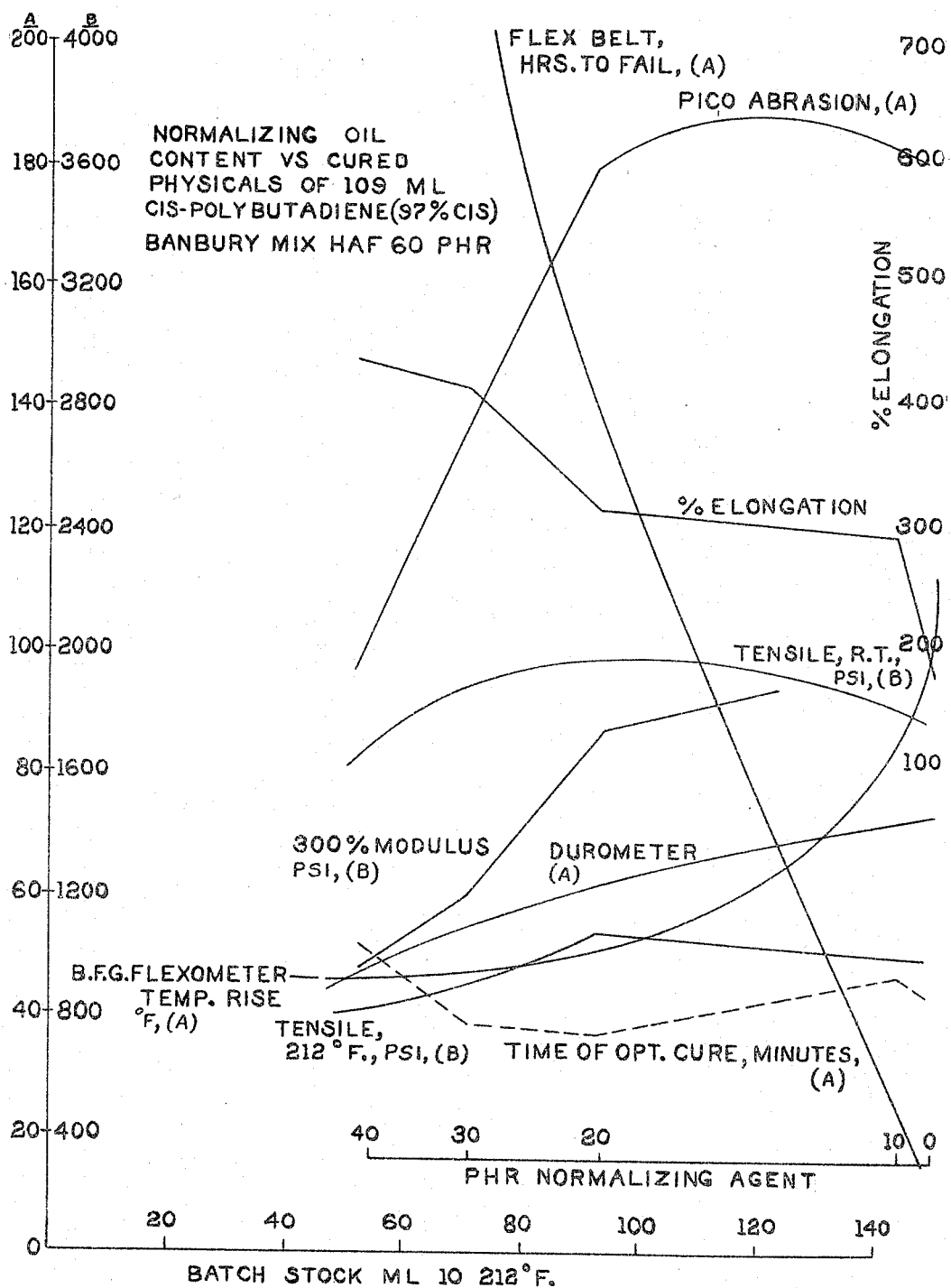
Figure 9:
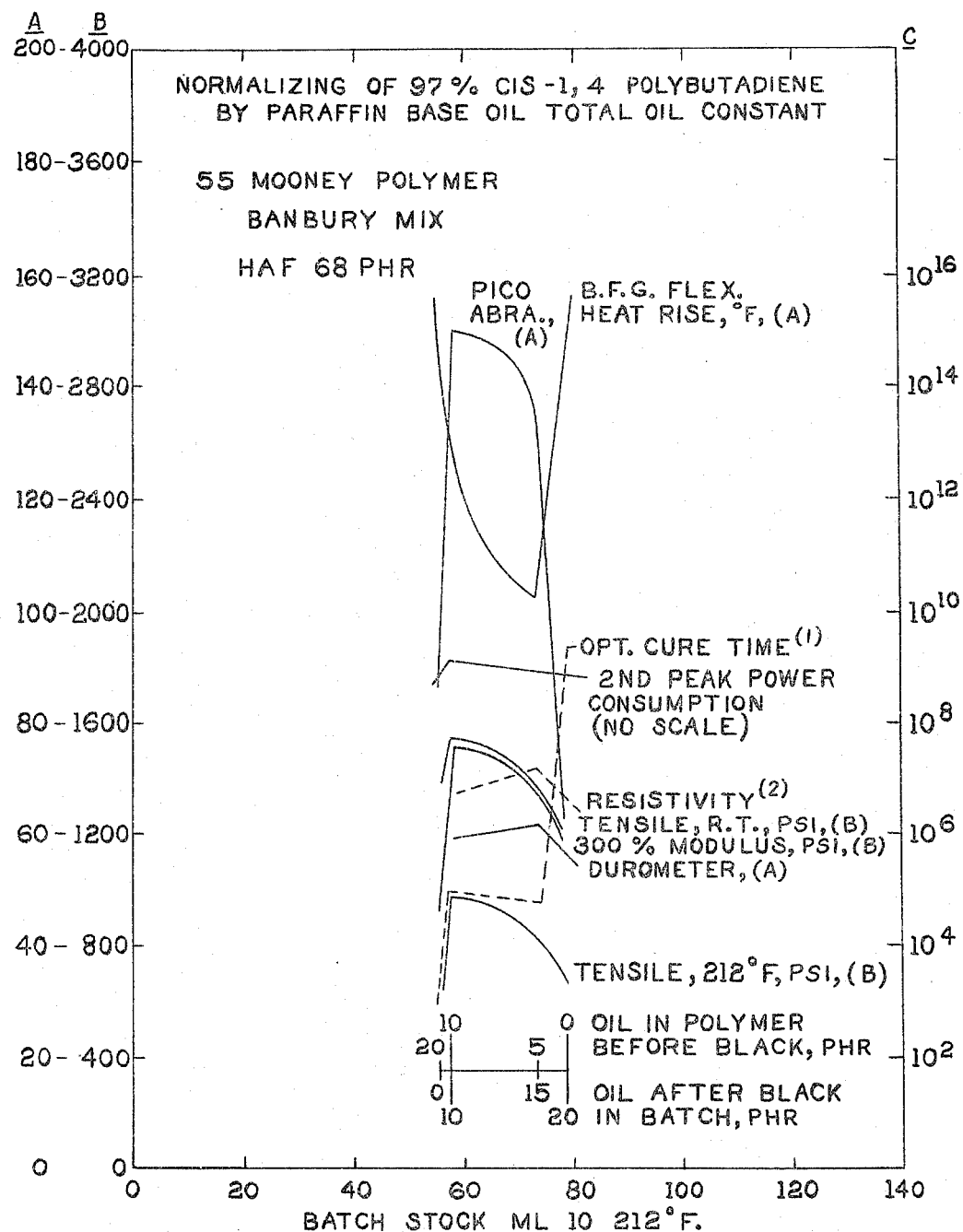
Figure 10:
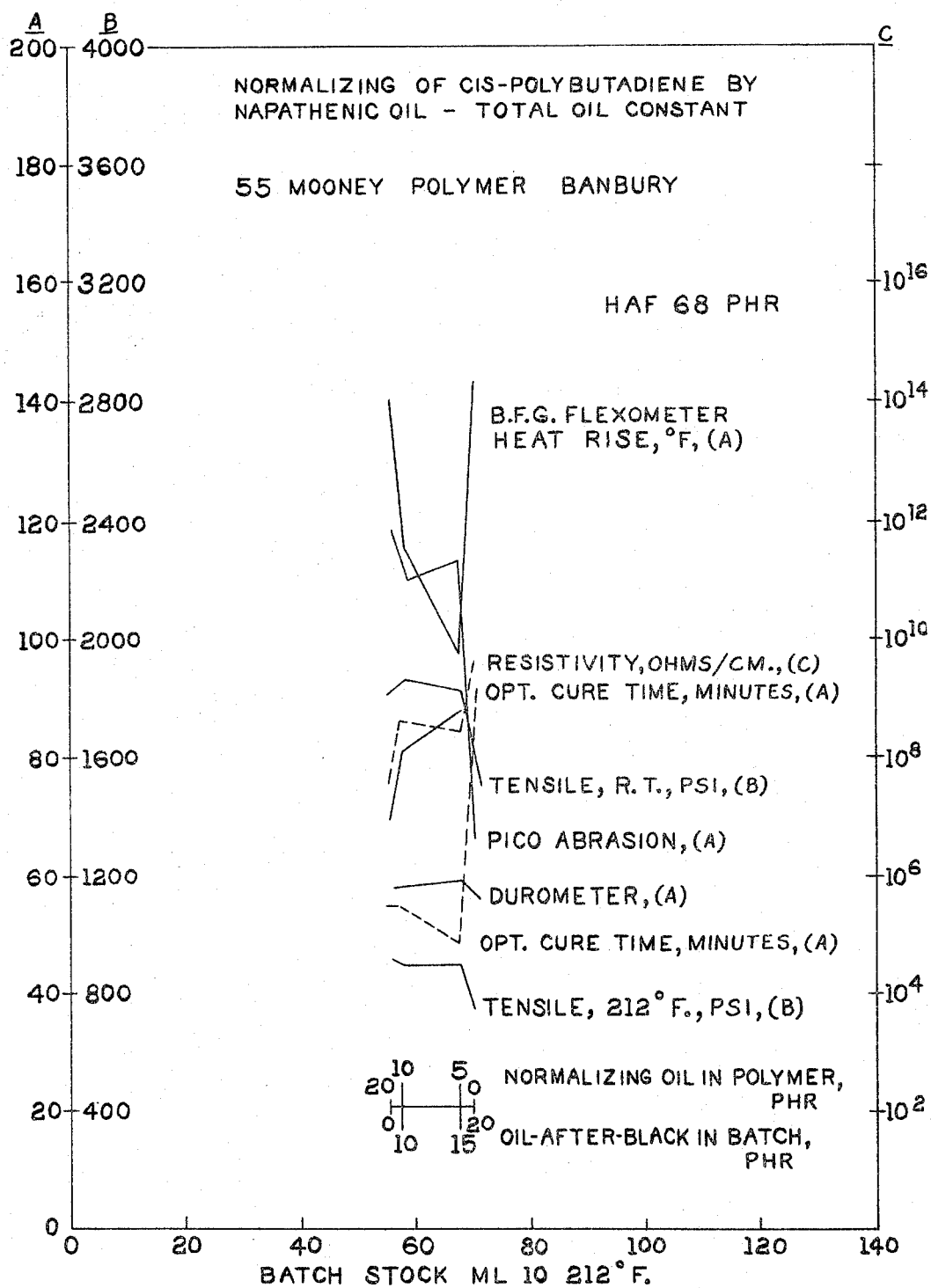
Figure 11:
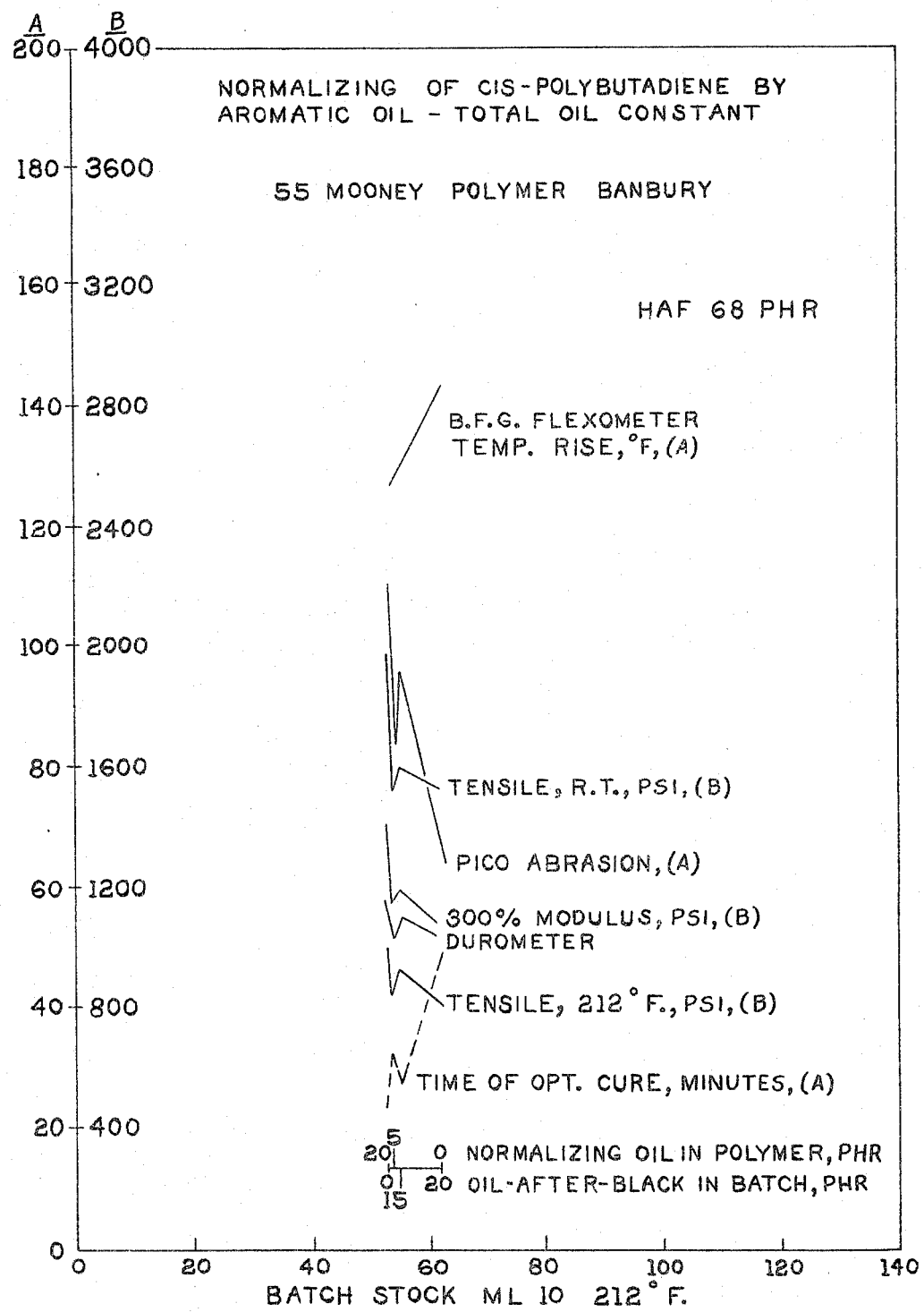
Figure 12:
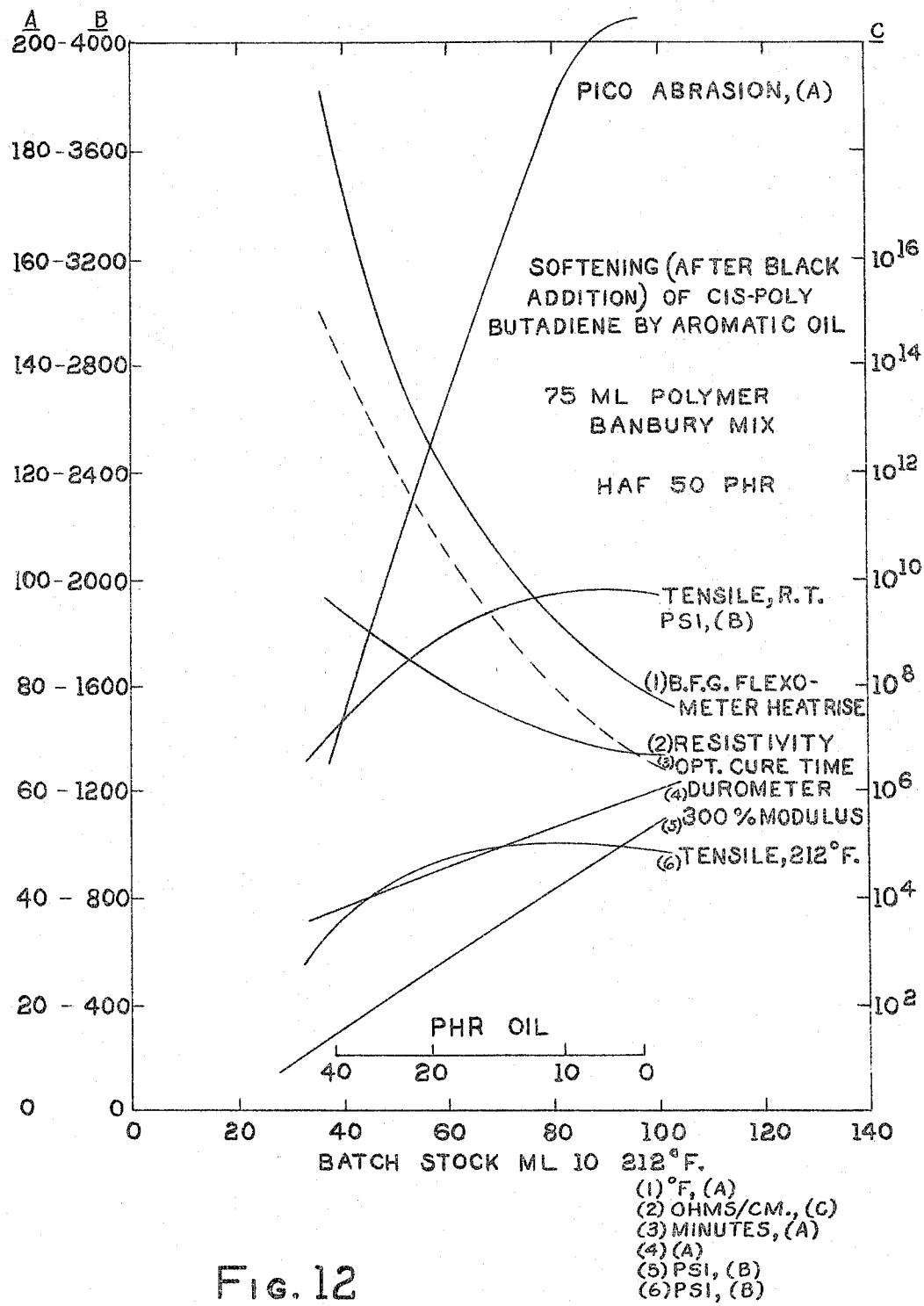
Figure 14:
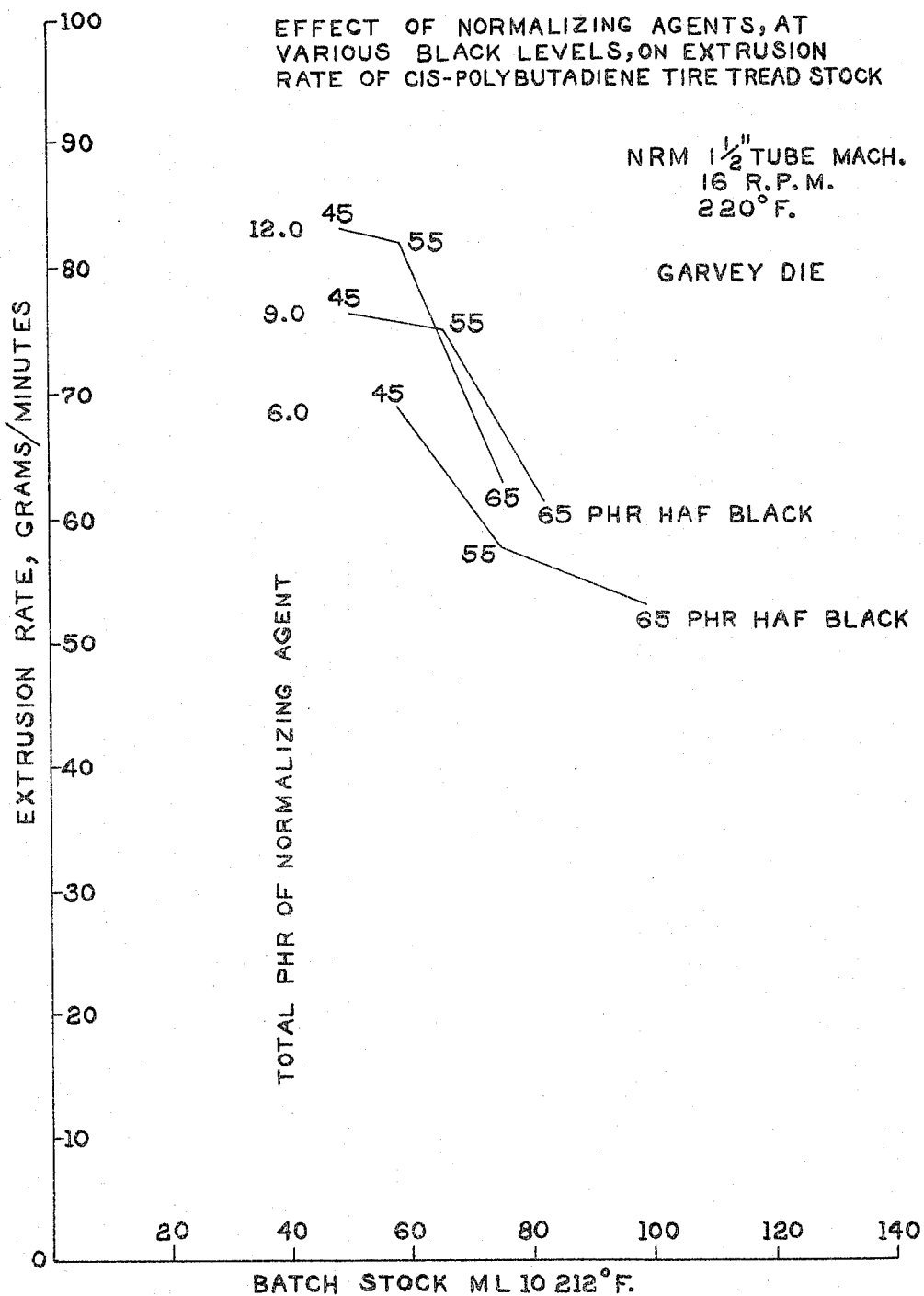

FIG. 3 is a family of Banbury power consumption curves, similar to those of FIG. 2, wherein the first-black-then-oil technique is applied to a cis-polybutadiene rubber (97% cis-1,4) at a number of different levels of carbon black (wherein the carbon black content is indicated as "PHR" meaning parts by weight of carbon black per 100 parts by weight of rubber), the power consumption decreasing as the carbon black level is increased;

FIGS. 4a and 4b, the figure being broken because of its extreme length, present a family of Banbury power consumption curves obtained when a normalized cis-polybutadiene rubber (97% cis) which has first been mixed with a normalizing paraffinic oil and fatty acid is mixed with carbon black, these curves dramatically showing the great ease of incorporating the carbon black when the rubber, the oil and fatty acid have first been mixed before adding the black;

FIG. 5 is a family of curves similar to those of FIGS. 2–4 but showing the great reduction in time for incorporation of carbon black into a normalized cis-polybutadiene rubber of 55 ML Mooney viscosity when the axiliary normalizing agents, benzoic acid, "K" gum rosin, and p-coumarone-indene ("Cumar") tackifier resin, are utilized;

FIG. 6 is a composite plot of physical properties of vulcanizates prepared from normalized cis-polybutadiene rubber (52 ML in the raw state) and illustrating that the optimum proportion of normalizing oil is in the 1–10 PHR range;

FIG. 7 is a composite plot similar to that of FIG. 6 but for a cis-polybutadiene rubber of 85 ML Mooney viscosity showing that there is an optimum degree of normalization at about 20 PHR of the oil;

FIG. 8 is a composite plot similar to those of FIGS. 6 and 7 but for a cis-polybutadiene rubber of 109 ML Mooney viscosity, this plot showing an optimum degree of normalizing in the range of 20–25 PHR of the oil;

FIG. 9 is a composite plot of the physical properties obtained at a constant oil level by adding a paraffin oil after the black to cis-polybutadiene rubbers already normalized to various levels by the same paraffin oil;

FIG. 10 is a composite plot similar to that of FIG. 9, but presenting data for compositions made with a naphthene oil;

FIG. 11 is a composite plot similar to those of FIGS. 9 and 10, but presenting data for compositions made with a relatively aromatic oil;

FIG. 12 is also a composite plot of the physical properties of cis-polybutadiene rubbers to which an aromatic softener oil in various amounts is added after carbon black;

FIG. 13 is a combined plot containing in the upper portion plots of the Mooney viscosity after the incorporation of various carbon blacks in natural rubber and, in the lower portion, similar plots showing the Mooney increase upon incorporation of the same carbon blacks in a cis-polybutadiene rubber, the numbers appearing in both plots being the specific surface areas in square meters/gram of the blacks utilized; and FIG. 14 is a composite plot of the effects on the Garvey Die extrusion rates of normalized tire tread stocks of cis-polybutadiene rubber containing various levels of HAF carbon black, such effects being shown at three different levels of total normalizing agent.

According to the present invention, cis-polybutadiene rubbers are "normalized," that is, they are converted to a condition wherein they exhibit normal processing and vulcanizing behavior, by swelling the cis-polybutadiene rubber with a small proportion of a particular type of hydrocarbon oil. The great stereoregularity of polybutadienes having a structure in which 80% or more of the butadiene-1,3 units are united cis-1,4 is believed to lead to a structure in which the chain-like polymer molecules are so highly coiled or "curled" that the material cannot flow in an acceptable manner. When normalized, the molecules are believed to be uncurled or opened up in such a manner as to flow more freely, accept carbon black more readily, and make more readily available a higher proportion of reactive sites for vulcanization so that the rubber can cure or vulcanize in less time and with the production of vulcanizates of vastly improved physical properties. The terms "normalize," "normalized" or "normalizing," as applied herein to the products and process of this invention, refer to the normality of the processing and vulcanizing behavior of the products in this invention, hence the derivation of the terms.

Vulcanized forms of normalized cis-polybutadiene rubber have an unusual combination of physical properties including extraordinary abrasion resistance, as shown by Pico abrasion indices of up to 600 or more and tire tread wear indices of 200 or more (with natural rubber or SBR tire controls rated at 100); exceptionally good hot strength, as shown by maximum elongation values occurring at 125° F. as versus a corresponding temperature of 50° F. for SBR; low heat build-up, this value often approaching that of natural rubber; air diffusion values higher than those of natural rubber and SBR; and remarkable resistance to cracking, chipping and tearing. Tire treads made from normalized cis-polybutadiene rubber have the highly unusual ability to perform progressively better, as compared to treads of natural rubber and SBR, as the severity of service increases. A second unusual characteristic, and a very valuable property, of tire treads of normalized cis-polybutadiene rubber is to perform progressively better, as compared to treads of natural rubber and SBR, as the total road mileage on the tire tread increases. These properties make normalized cis-polybutadiene rubbers uniquely adapted to use in the production of extremely heavy duty tires for service at high speeds and heavy loads such as are encountered by tires on large over-the-road trucks and buses and on airplanes and the like.

NORMALIZING AGENTS

The essential normalizing agent, from the standpoint of "normalizing" both processing behavior and the vulcanizate properties and particularly the heat generation, cure rate and abrasion resistance characteristics thereof, is a liquid or fluid hydrocarbon of low volatility which does not react with sulfur or the rubber and which is selected from paraffinic and naphthenic types of hydrocarbon oils. Relatively aromatic and aromatic hydrocarbon oils, while relatively ineffective in improving the vulcanizate properties, do normalize cis-polybutadiene rubber, but to a lesser degree than the preferred paraffinic and naphthenic oils. This agent must have a boiling point or sublimation temperature above the temperatures at which the rubber is processed and vulcanized to avoid losses during processing. This means the essential normalizing agent should have a boiling point above about 350° F. Thus, a strongly preferred normalizing agent is a refined hydrocarbon oil having a viscosity-gravity constant (VGC) above about 0.79 and below about 0.90. In this manner of defining or characterizing a hydrocarbon oil, the Viscosity-Gravity Constant is a function of the composition of the oil, this value increasing as the proportion of naphthenic and aromatic rings in the oil increases. The Viscosity-Gravity Constant is calculated according to the formula:

$$VGC = \frac{G - 0.24 - 0.22 \log (V_1 - 35.5)}{0.755}$$

wherein G is the Specific Gravity of the oil at 60° F. and $V_1$ is the Saybolt Universal Viscosity at 210° F. Other formulas exist for utilizing gravity and viscosity values taken at other temperatures.

When the VGC of an oil, as given by the above formula, is between 0.79 and 0.82 the oil normally is classified as highly paraffinic in composition; when the VGC is between 0.82 and 0.85 the oil is classified as "relatively paraffinic" and contains increased proportions of naphthenic material; and when the VGC is between 0.85 and 0.90 the oil is classified as naphthenic. Oils having a VGC above 0.90 and up to 0.95 are considered to be "relatively aromatic" since they contain reduced proportions of paraffinic materials and are made up largely of napthenic and aromatic materials. Oils having a VGC from about 0.95 to about 1.0 are classified as "aromatic" in nature, while those having a VGC above 1.0 are classified as "highly aromatic." Paraffinic and "relatively paraffinic" oils are the best normalizing oils and the naphthenic oils also are useful for this purpose, although not quite to the same extent as are the more paraffinic materials. The ability to normalize seems related to the ability of the oil to swell the cis-polybutadiene rubber (the cis-polybutadiene rubbers swell more rapidly and to a greater extent in paraffinic and naphthenic oils than do natural rubber or SBR). Both the degree and rate of swelling of cis-polybutadiene rubbers increases as one progresses downwardly in VGC value of the oil. Relatively aromatic oils and those classified as aromatic normalize the processing behavior of cis-polybutadiene rubbers, improve processing to some extent and the resulting normalized products can be utilized in applications where high abrasion-resistance and low heat generation are not critically important. Highly aromatic oils are of little value in normalizing either the processing or vulcanization behavior of cis-polybutadiene rubbers.

The normalizing oils seem to hold the Mooney rise of the cis-polybutadiene rubber upon the incorporation of carbon black to a minimum. Aromatic oils are not as efficient in this respect as paraffinic and napthenic oils.

This effect of the normalizing oils is obtained only when the oil is added before the carbon black and under conditions insuring complete swelling of the rubber by the oil. This latter effect is shown in FIGS. 4a–4b of the drawings and in Table I below wherein a cis-polybutadiene rubber of 55 Mooney viscosity (ML–4–212° F.) is compounded in a Banbury with 6 phr. of a paraffinic oil, 3 phr. of crude lauric acid, 3 phr. of "Catalin 8318" (a condensate of formaldehyde and an octyl phenol) which is added together with the oil and acid, and 55 phr. of a high structure carbon black (ISAF): Sample A being a normalized composition wherein the oil and fatty acid are incorporated 24 hours before the black; Sample B being a normalized composition wherein first the oil and fatty acid and then the black are incorporated in closely-spaced successive Banbury mixing cycles; Sample C being a composition in which the oil and fatty acid are added simultaneously with the black; and Sample D being a composition made by the conventional Banbury mixing order of first the carbon black and then the oil and fatty acid.

TABLE I

| Sample | | Batch Mooney Viscosity ML–10, 212° F. |
|---|---|---|
| A | Oil and fatty acid added 24 hours before carbon black. | 69 |
| B | Oil and fatty acid added just before carbon black. | 75 |
| C | Oil and fatty acid added simultaneously with black. | 82 |
| D | Oil and fatty acid added after black. | 78 |

With cis-polybutadienes of up to 120 ML–4 Mooney viscosity the reduction of the Mooney rise with black incorporation shown in Sample A above is even more pronounced.

The normalizing oils, when utilized in the required small proportions, do not act as softeners or as extenders of the rubber; rather these oils swell the cis-polybutadiene rubber and make it act much tougher during carbon black incorporation. The latter toughening action is easily observed by measuring the power absorbed by the rubber during carbon black incorporation in a Banbury mixer. This effect is clearly shown in FIGS. 4a–4b of the drawings wherein the curves representing the normalized compositions (labelled "A" and "B") are higher (indicating greater work expenditure) and soon reach a plateau indicating that the time for incorporation of black is very short. In contrast when the organic acid and paraffinic oil are added simultaneously with, or subsequent to, the addition of black, the power curves ("C" and "D") FIGS. 4a–4b are lower and slowly rise for a greatly extended period of mixing (indicating slow black incorporation). Thus, the normalizing process seems to open up the structure of the rubber causing the rubber to accept the black and more energy to be absorbed by the rubber. This is an effect exactly opposite to the effects of oil-softening or oil-extension of SBR wherein less work is absorbed by the rubber upon incorporation of softening oils. The normalizing process is effective with a low gel cis-polybutadiene rubbers (below about 10% gel) of all Mooney viscosities in the range of from about 35 ML to about 120 ML whereas oil-extension of SBR is effective only with the toughest, high Mooney grades (90 ML and above) of SBR.

The normalizing process as applied to cis-polybutadiene rubbers also is fundamentally different from oil-extension of SBR as respects the effects on the physical properties of vulcanizates. FIGS. 6, 7 and 8 of the drawings show the variation in the physical properties of vulcanized forms of cis-polybutadiene rubbers of various raw rubber Mooney values which had been mixed with paraffin oil before incorporation of the carbon black. It is readily apparent in FIG. 6 that the physical property curves for a 52 ML cis-polybutadiene rubber seem to be improved and are relatively constant in the range of 0–10 phr. of the oil. The properties of Belt Flex, tensile strength, percent elongation, BFG Flexometer temp. rise, and 212° F. tensile seem to be improved somewhat in this range of oil while 300% Modulus and Durometer hardness values are but slightly decreased. In contrast to this flat-top or plateau effect on the properties of cis-polybutadiene rubber, the oil-extension of SBR reduces all properties of the vulcanizates by an amount about proportional to the amount of oil.

In FIG. 7 the "plateau effect" in an 88 ML cis-polybutadiene rubber is extended out to about 20 phr. of the normalizing oil, FIG. 7 showing a greater reduction in time of optimum cure and Flexometer heat rise values and smaller effects on Pico abrasion and Durometer hardness than in FIG. 6. FIG. 8 is similar and shows that the plateau extends out to about 25 phr. for the much tougher 109 ML rubber.

To show that the results of FIGS. 6 through 8 cannot be obtained by any other order-of-addition for the oil, reference should be had to FIGS. 9, 10 and 11 of the drawings. FIG. 9 is a composite plot of the physical properties of a group of vulcanized cis-polybutadiene rubbers, all containing 20 phr. of a paraffinic oil. The limiting compositions each contain 20 phr. of the paraffinic oil added, respectively, before and after carbon black addition. Intermediate compositions in FIG. 9 have a portion of the oil added before, and the remainder after, carbon black addition. The trend in FIG. 9 strongly favors oil addition before the black. Note that addition of a paraffinic oil after the black does nothing to aid processing, for the "Batch Stock ML–10–212° F." (Mooney viscosity) is more than 20 points higher than when the same amount of oil is added before the carbon black. Note also the materially lower Mooney viscosities and shorter cure times required by the compositions containing the oil added before the carbon black. A similar result is shown to result in FIG. 10 from the use of a naphthenic oil. In contrast, FIG. 11 shows the quite narrow spread in compounded Mooney viscosity, when an aromatic oil is added, (irrespective of its mode of addition) indicating a limited normalizing action.

The normalizing process not only improves the dispersion of carbon black and therefore the physical properties, but also the resulting normalized vulcanizable compositions are smooth flowing materials which produce high quality extrusions and calendered sheets. The extrusion qualities of rubber compositions are evaluated by extruding the vulcanizable composition through an extrusion die especially designed so as to require great plasticity in a rubber for good extrusions. The latter is more commonly known in the rubber art as a "Garvey Die" and carries a tentative ASTM designation of "Extrusion Die-Garvey Type." The vulcanizable cis-polybutadiene rubber composition is extruded through such a die at 220° F. and the rate of extrusion measured by weight and/or linear length of the extrudate produced in a given time. The surface appearance, dimensions and overall appearance of the extrudate are also given consideration in evaluating the extrusion quality. The Garvey Die has sharp, acute angles which tear the edges of extrudates made from stocks of anything but the best extrusion quality producing saw-tooth edges on the extruded material. Only rubber compositions of the very best processing qualities produce Garvey Die extrusions of acceptable quality. The normalized, vulcanizable compositions of cis-polybutadiene rubbers of this invention extrude smoothly through the Garvey Die producing smooth-surfaced extrudates having smooth continuous edges. FIG. 14 of the drawings shows that these same compositions extrude at very satisfactory rates; FIG. 14 being a plot of the weight of extruded material versus the Mooney viscosity of the vulcanizable composition. The three curves of FIG. 14 represent the weights of extrudate obtained at each of three levels of normalizing agents and at each of three levels (45, 55 and 65 phr.)

of high structure carbon black (HAF). Note the significant improvement in rate of extrusion as the total proportion of normalizing agents increases. Also note that at all three levels of normalizing agents, 55 phr. of the carbon black appears to be about maximum for high extrusion rates for the recipes utilized.

As indicated above and as shown in the drawings, the processing quality of the normalized rubber improves with increased proportions of normalizing oils whereas the physical properties of vulcanizates may be degraded by too high a proportion of these agents. It is required, therefore, that the proportion of normalizing oil be kept as low as is consistent with the desired processing quality. In general, this means that not more than 25 phr. be utilized and this only for the higher molecular weight rubbers of 80-120 ML Mooney viscosity In general, irrespective of the Mooney viscosity of the cis-polybutadiene rubber, as little as 1-2 phr. of normalizing oil will have a readily ascertainable effect on processing quality and it is seldom necessary to utilize more than about 15 phr. of total normalizing ingredients. The proportion of normalizing oil to be added in any given situation will depend on a number of factors including:

(1) The Mooney viscosity of the cis-polybutadiene rubber, as this value increases the total proportion of normalizing agents required for best processing quality usually increases, see FIGS. 6 through 8 of the drawings;

(2) The total proportion of carbon black and other solid, finely-divided fillers and reinforcing pigments to be incorporated, the higher proportions of these ingredients requiring the higher proportions of normalizing ingredients (see FIG. 14); and (3) The molecular weight distribution of the polymer has some effect, increased proportions of lower polymer serving to reduce somewhat the proportion of normalizing agents required for good processing and best vulcanized properties.

Taking the above-enumerated factors in order, it is found that low gel cis-polybutadiene rubbers having (in the raw state) an ML-4-212° F. Mooney viscosity of from about 35 to about 120 respond readily to normalization. In the Mooney range of about 35 to about 65, the optimum proportions (as respects most physical properties) of total normalizing agents appears to be in the range of from about 2 to about 10 phr. With rubbers of 75-100 ML the optimum total proportions of normalizing agents seems to be in the range of from about 5 to about 15 phr. Optimum processing with any of the cis-polybutadiene rubbers usually is obtained in the range of from about 2 to about 20 phr. of total normalizing agents.

Usually, more than about 25 phr. of carbon black are required for good vulcanized properties. The maximum proportion of black that can be incorporated and the composition further processed is about 100 to 125 phr. Much better results are obtained with from about 35 to about 80 phr. of carbon black, this range including both tire carcass and tire tread compounds. Best results in tires are obtained with from about 40 to about 65 phr. of the high structure carbon blacks, as defined below. The proportion of normalizing agents, as indicated, should be balanced against the proportion of carbon black to be incorporated within the ranges given.

The remaining factor affecting the proportion of normalizing agent required for good processing and best vulcanizate properties concerns the tendency of the cis-polybutadiene catalysts to produce polymers having a relatively narrower molecular weight distribution than is observed, for example, in natural rubber and in SBR. Also, these same catalysts produce polymers the molecular weight of which increases with time of reaction. It is desirable in an economic sense to convert expensive butadiene-1,3 monomer to high polymers and utilize relatively less expensive normalizing agents to impart improved processability. While cis-polybutadiene rubbers made at low conversion (i.e., 40–60%) are more easily processable than those made at more complete conversion, the increased costs of recycling unreacted monomers makes it desirable to provide a method for processing of the high conversion, high molecular weight polymers.

Thus, it is possible to produce cis-polybutadiene rubbers having appreciable proportions of lower polymers and these products are somewhat easier to process. In most cases, normalization is still required, although the total proportion of normalizing agents required is in the lower end of the ranges given. When the total proportion of low molecular weight polymer (extractable with pentane; below about 5000 mol. wt.) in the cis-polybutadiene rubber is above about 10%/wt., the properties of its vulcanizates are inferior to those of similar rubbers of the same or higher Mooney viscosity but of narrower molecular weight distribution.

AUXILIARY NORMALIZING AGENTS

Further improvements in processing of the cis-polybutadiene rubbers can be obtained by adding small proportions of other valuable but not essential normalizing agents mentioned above. The effect of these other ingredients is usually manifested by a reduced time required for incorporating carbon black as is readily seen in FIG. 5 of the drawings. One such optional ingredient, as indicated above, is an organic acid of low volatility added in proportions ranging from about 0.5 to 10 phr. or more, more preferably from about 1.5 to about 6 phr. At least two considerations affect the choice of acid and its proportions to be utilized. One is the complete absence of fatty acid material in cis-polybutadiene rubbers, as usually made. In this, these rubbers differ from natural rubber and SBR, both of which usually contain acidic materials in their as-received condition. It is necessary, therefore, to supply the fatty acid deficiency needed for cure regulation and, in addition, additional fatty acid for normalizing action. The physical properties of vulcanizates of cis-polybutadiene rubber, therefore, improve as the proportion of acid is increased in the range up to 10 phr. Increased proportions of a fatty acid sometimes adversely affects the "tack" of the rubber, that is, it imparts a surface lubricating quality which could interfere with good ply adhesion in the building of tires or other laminated rubber products. It is generally recommended, therefore, to utilize from about 1.5 to 6 phr. of acid for best results.

Any organic acid which boils or sublimes above about 350° F. can be utilized including aliphatic carboxylic acids such as decanoic acid, undecanoic acid, lauric acid, myristic acid, palmitic acid, stearic acid, halogenated stearic acid, oleic acid, linoleic acid, linolenic acid, crude tallow fatty acids, crude tall oil acids, hydrogenated tallow acids, coconut oil fatty acids, soya bean oil fatty acids, linseed oil fatty acids, corn oil fatty acids, cottonseed oil fatty acids, palm oil fatty acids, and many others; aromatic carboxylic acids such as benzoic acids (see FIG. 5), ortho-mercapto benzoic acid, naphthenic acids, and others; and naturally-occurring complex acids and acidic materials such as wood rosin, "K" Gum rosin (FIG. 5), disproportionated wood rosin, rosin acids, pine oil acids, and others.

Preferred organic acids are the saturated monocarboxylic acids containing at least 10 carbon atoms, preferably 12 to 20 carbon atoms or more. Such saturated acids have less effect on the rate of vulcanization whereas some of the unsaturated acids such as soya bean oil fatty acids have a retarding effect. The saturated acids produce vulcanizates having maximized abrasion resistance and lowest Flexometer heat rise values. The unsaturated acids, and particularly the technical grades of vegetable oil fatty acids, seem to have a more beneficial effect on the processing quality of the normalized rubber. For the latter reason, it is sometimes desirable to utilize mixtures of saturated and unsaturated acids such as are obtained in some cases in the form of crude acid mixtures of technical grade.

Another advantageous, auxiliary normalizing ingredient is a rubber tackifier. Many of these tackifiers are acidic in nature, for example, phenol/formaldehyde tackifier resins, rosin acids, pine oil acids, etc., and there is no clear line of demarcation between organic acids and tackifiers. In general, known rubber tackifiers are useful in the normalizing process, although certain tackifiers are much better than others. Illustrative rubber tackifiers found useful are condensates of formaldehyde with phenols, particularly with the "hindered" or alkylated phenols, condensates of alkylated phenols with acetylene, "K" Gum rosin, "Cumar" resins (p-coumarone-indene resins), polymerized alkylated aromatic hydrocarbons, furfural resins, terpene resins, pine oils, gums and pitches, pine oil acids, and many others. Of these, the alkylated phenol/formaldehyde condensates and polymerized alkylated aromatic hydrocarbons are best.

The tackifier material is not fulfilling its usual role in the process of the present invention. Tackifying materials are conventionally utilized in rubber compounding to improve the building "tack" so as to enable one layer of vulcanizable rubber to adhere to another. In the normalizing process, however, the tackifier may serve to improve the coherency of the raw cis-polybutadiene rubber and reduce the tendency of the rubber to crumble during the time the rubber is being mixed with carbon black and other compounding ingredients.

The proportion of the tackifier ingredient may vary from as low as 0.5 phr. to as high as 15 phr., although from about 1 to 10 phr. will usually be sufficient.

Since the normalizing oils, the fatty acid, and the tackifier ingredients all have softening effects to a greater or lesser degree on the rubber, it is required that the total proportion of these ingredients be restricted in order to avoid impairment of the physical properties of the vulcanizates. It has been found that the total proportion of the normalizing ingredients should, as indicated above, be 25 phr. or less. This means, of course, that one cannot utilize the maximum proportion recited above for each of the above essential and optional normalizing agents since the sum total of these obviously can be more than 25 phr.

When the normalized cis-polybutadiene rubber is to be vulcanized with sulfur/accelerator combinations, it is generally required that zinc oxide be incorporated to form a part of the cure accelerating system. Small amounts of zinc oxide as low as 0.5 phr. will do this and up to 5 or 10 phr. can be employed, if desired, although 1 to 6 phr. will usually be sufficient. While both American and French process zinc oxides can be employed, the American process type is preferred because of a favorable effect on processing quality.

Levels of vulcanization agents to be utilized will depend on the carbon black and proportion thereof, on the degree of vulcanization required, and on the processing history of the rubber composition. Normalizing the cis-polybutadiene rubber, because it promotes the cure of the rubber, may reduce sulfur and accelerator levels below that required for equivalent states of cure in unnormalized cis-polybutadiene rubbers. The amount of sulfur required in normalized cis-polybutadiene rubbers usually is less than is required in natural rubber and SBR. Usually from about 0.5 to about 5 phr. of sulfur, or its equivalent, may be utilized although fully cured vulcanizates are obtained with 1.0–1.5 phr. of sulfur (with proper accelerator level). Better aging properties are shown by low-sulfur vulcanizates made at 0.5 to 1.0 phr. of sulfur although poorer freeze resistance is shown by the low-sulfur vulcanizates. "Sulfur-free" vulcanization can be obtained by use of equivalent amounts of sulfur-yielding vulcanization agents such as tetramethyl thiuram disulfide, "Sulfursol", and others.

Any accelerator of sulfur vulcanization can be employed, although it is generally desirable to utilize accelerator types which do not isomerize the rubber. A strongly preferred type of accelerator is amine type such as the heptaldehyde/ammonia reaction product known as "Hepteen Base", diphenyl guanidine, di-o-tolyl guanidine, and others. Another useful in black-containing compounds is the sulfenamide type such as N-cyclohexyl-2-benzothiazole-sulfenamide. Accelerator levels of 0.2 to 2.0 phr. can be employed with from 0.4 to 1.5 phr. being particularly preferred for tire carcass and tire tread compositions. Bis (benzothiazyl sulfide) is another commonly used rubber accelerator which may be utilized to cure normalized cis-polybutadiene rubbers, although it is sometimes desirable to buffer such compositions by adding mixtures of lecithin and triethanolamine. Still other accelerators can be employed.

HIGH STRUCTURE CARBON BLACKS

While, as indicated above, any carbon black can be employed in the process and compositions of this invention, it is strongly preferred to utilize special types of carbon blacks known as "high structure blacks." For the purposes of this invention, a high structure carbon black is a carbon black having an oil absorption value of at least 13 gallons/100 lbs. Preferred carbon blacks of this type have oil absorption values in the range of from about 13 to about 20 gallons/100 lbs. Under high magnification, high structure blacks appear to have their particles associated in chain-like or filamentary structures. The high structure type of black reduces the "nerve" of the cis-polybutadiene rubber and contributes greatly to better processing of the cis-polybutadiene rubbers with consequent better carbon black dispersion and also to the obtaining of vulcanizable compositions which are easily susceptible of being calendered and extruded (both operations being required in the production of tires) to form articles of smooth finish and true dimensions. Carbon blacks lower in structure (i.e., lower in oil absorption values) than specified are not "wetted" to the same extent by the normalized cis-polybutadiene rubbers and are dispersed poorly therein; compositions containing lower structure blacks process very poorly forming calendered sheets and extruded shapes of very rough finish and of varying shape and dimensions; and vulcanizates containing low structure blacks have mediocre-to-poor physical properties. These high structure carbon blacks are utilized in the preferred tire tread compositions in proportions of from about 45 to about 65 phr. and in the preferred tire carcass compositions in proportions of from about 40 to about 50 phr. Mixtures of high and low structure carbon blacks can be employed, providing that at least 25%/wt. of the total carbon black is a high structure type, as above defined.

NORMALIZING PROCESS

A cis-polybutadiene rubber is normalized by causing the rubber to swell and absorb a hydrocarbon oil and/or the other normalizing ingredients uniformly throughout its structure. Such an absorption and swelling process appears to be both time- and temperature-dependent. For example, when adding a normalizing hydrocarbon oil (and from the standpoint of "normalizing" the processing behavior, irrespective of the normalizing of vulcanizate properties, any hydrocarbon oil having a V.G.C. from about 0.79 up to about 1.0 can be utilized) to cis-polybutadiene rubber on a cool rubber mill (rolls maintained ca. 85° F.), very little normalizing effect will be observed during the milling operation. When, however, the freshly-prepared mixture is removed from the mill and allowed to stand for 12 to 24 hours at room temperature, and then is returned to the mill, the mix is of very materially improved milling behavior. The sheet smooths out on the mill, clings to one roll and very readily accepts carbon black. If the freshly prepared mixture of rubber and normalizing agents is heated in an oven for 1 to 4 hours at 150° F., the same improvement in processing quality is observed. Likewise, when the mixing is carried out at 150–400° F., for example in a Banbury mixer, the absorption of the normalizing oil is nearly complete in a few minutes' mixing time. This effect is illustrated by curves "A" and "B," of FIG. 4, there being but a small reduction in black incorporation time when the mixture prepared at about 300° F. is allowed to stand for 24 hours before incorporating the carbon black over that obtained when the normalizing agents are added at high temperatures just before the black. Note, however, that addition of the normalizing agents simultaneously with, or subsequent to, the addition of carbon black does not have the same effect. Moreover, when the normalizing agents are added in the latter manner, allowing the mixture to stand does not result in normalizing of the rubber, see FIG. 9 of the drawings.

There is a distinct difference in the properties of the hot-mixed, normalized compositions as compared to cold-mixed (80–120° F.) normalized compositions. For example, the hot-mixed compositions excel in abrasion resistance and do not generate as much heat rise on flexing as do the cold-mixed materials. On the other hand, the cold-mixed compositions sometimes have somewhat better tensile strengths and modulus values than do the hot-mixed materials. The hot-mixed normalized compositions of this invention, however, can be modified by a cold re-working at 80 to 120° F. so as to have better tensile properties. The cold-mixed materials, when made with normalized rubber, can be upgraded to some extent in abrasion resistance and heat rise properties by re-working at 150–400° F.

The cis-polybutadiene rubber and the normalizing agents are combined and mixed in such a way as to uniformly distribute the latter in the former. This usually can be accomplished during the manufacture of the rubber whereby the normalizing agents, for example the normalizing oils, are dissolved in the solvent/rubber mixture resulting from polymerization and the polymer worked up in the usual manner. Under the usual commercial warehousing and shipping practices the rubber will have had entirely adequate aging upon delivery to a customer to insure complete absorption of the normalizing ingredients and swelling of the rubber. More simply, the normalizing oil can be incorporated in the rubber by mixing the two materials, the rubber preferably in finely-divided form, and allowing the mixture to stand until absorption of the oil by the rubber occurs. When the oil/rubber mix is heated, for example at temperatures of 100 to 450° F., the latter diffusional process is speeded up. The normalizing ingredients, and especially the normalizing oils, also may be mixed with the rubber on a rubber mill or in an internal type mixer, such as a Banbury, at any temperature at or above room temperature up to about 450° F. Preferred Banbury mixing temperatures are 150–400° F. However incorporated in the rubber, it is to be understood that (1) the normalizing ingredients must be uniformly dispersed and actually be absorbed by the rubber, and the rubber swollen thereby, not merely mechanically dispersed therein and (2) the normalizing process must be essentially complete before carbon black, zinc oxide, and other solid, finely-divided materials are added to the rubber.

Figure 1:
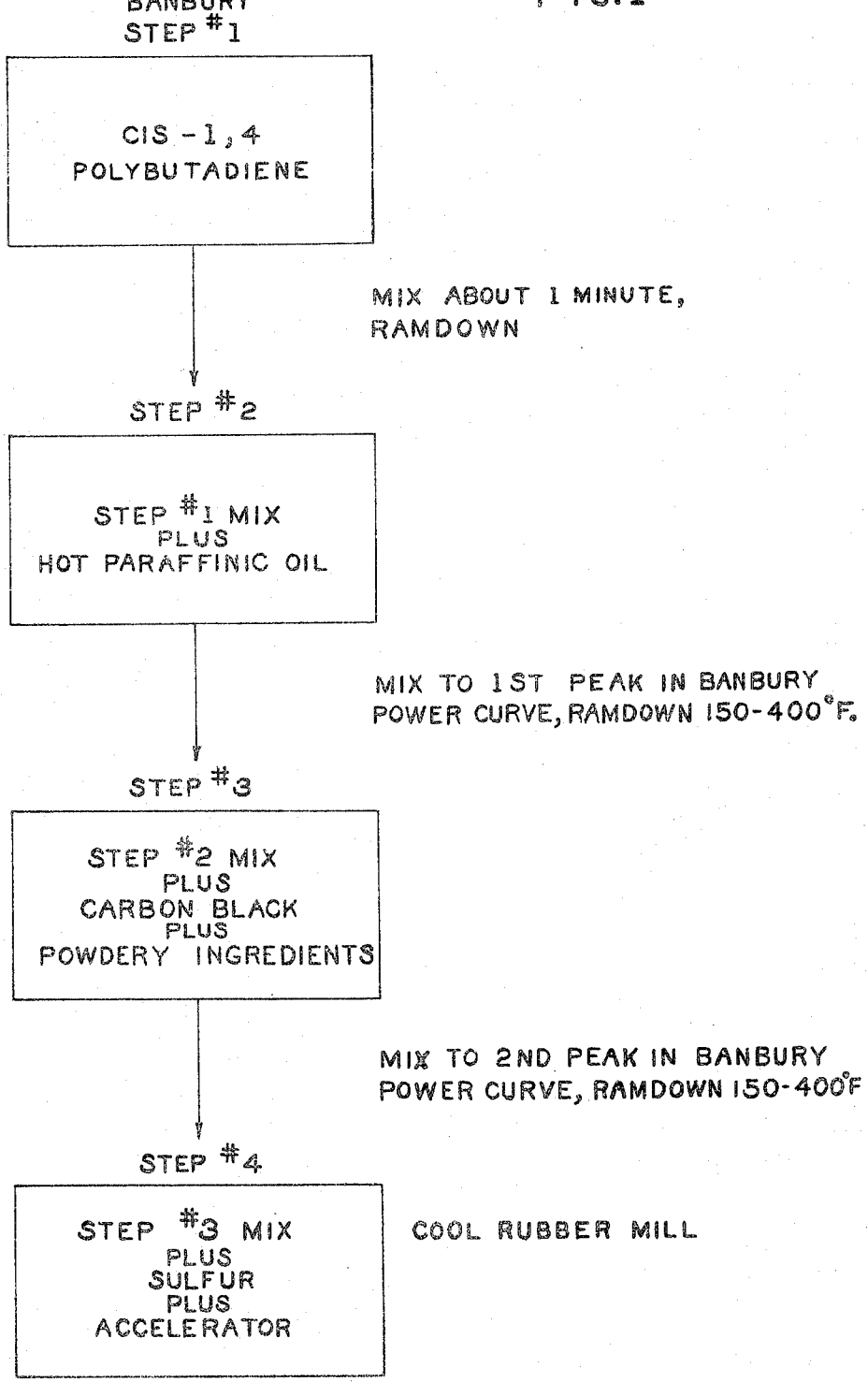
FIG. 1 is a block diagram showing the steps of the normalizing process of this invention when carried out in a Banbury mixer.

A particularly preferred procedure, most readily adaptable to the plants of rubber goods manufacturers, is shown in FIG. 1 of the drawings. Such process involves Banbury mixing. In this procedure the raw cis-polybutadiene rubber is charged to the Banbury and the ram closed for a minute or two to "warm up" the rubber (Step #1) and then the mixer is opened and all of the normalizing ingredients are charged to the Banbury, the ram closed, and the Banbury operated (Step #2) until thorough mixing occurs. An accurate and very sensitive control device indicating complete dispersion is to insert a recording power meter in the Banbury drive motor circuit. Typical power consumption charts obtained in this manner are shown in FIGS. 2–5 of the drawings.

It will be observed that the power consumed in Step #2 rises immediately from the raw polymer level to a very high first maximum which is considerably higher than the raw polymer plateau. Continued mixing results in a slow fall in power consumption as the polymer breaks down. This is Step #2 in FIG. 2. After not more than about 3 to 5 minutes the dispersion of normalizing ingredients is complete and the mixing can be interrupted for the addition of carbon black. In the normalizing step it is sometimes advantageous to pre-heat the oil before adding it to the Banbury. For this purpose, the oil is heated to 150 to 400° F.

At this point, the carbon black, zinc oxide, fatty acids (if not added during normalizing), antioxidants, and other solid, finely-divided compounding ingredients are added. These ingredients preferably are added all at once and not incrementally in several portions. It has been found that the mixer expends much more work on the mixture when all the carbon black and accompanying ingredients are added at one time. Sulfur and accelerators are added later. The ram is again closed and the mixer operated for another 2 to 6 minutes or more. This is Step #3, FIG. 1. The power consumption curve again rises sharply to a second maximum, point "M," FIG. 4a, which is materially higher than the first maximum attained during the normalizing step. As soon as a steady state or plateau is reached, wherein the power consumption drops slightly, the carbon black and other additives are well dispersed and further mixing will not materially improve dispersion. The Banbury mixer is again stopped and opened.

At the end of this procedure, Step #3 of FIG. 1, the material in the mixer is a normalized mixture of rubber, oil, fatty acid, tackifier, carbon black, and zinc oxide. It is a plastic, workable material which requires only the addition of vulcanizing agents to form a vulcanizable composition.

The addition of vulcanizing agents can be performed on a cool rubber mill (as shown in Step #4, FIG. 1) or in the Banbury mixer but the temperature of the stock must be maintained below the temperature at which the particular vulcanization or curing system is activated. The latter temperature usually is 275° F. or higher so that a stock temperature during addition of the curing agents of 250° F. or lower is quite safe. Incorporation of the vulcanizing agent or agents is complete in 1 to 3 minutes and the batch can be dumped out of the Banbury mixer onto a cool "sheet-out" mill where it is converted to convenient-to-handle sheet form. The resulting plastic, vulcanizable composition can be calendered or extruded at temperatures of 200–400° F. to form sheets or extruded articles of very good finish. Garvey Die extrusions at 220° F. are obtained (see FIG. 14) indicating the stock flows more smoothly and at about the same or higher rates as are obtained with corresponding compositions of SBR or natural rubber. Complete tire tread caps for the largest truck and bus tires have been extruded at good rates in conventional tread tubing equipment from the normalized 100% cis-polybutadiene rubber compositions of this invention.

As employed herein, the term "cis-polybutadiene rubber(s)" means a rubbery homopolymer of butadiene-1,3 having a structure in which at least 80% of the butadiene units are joined cis-1,4. Much better results are obtained with such homopolymers of butadiene in which at least 90% of the butadiene units are united in the cis-1,4 structure. Best results are obtained with polybutadienes in which at least 95% of the butadiene units are united cis-1,4. Like most other physical properties, the processing quality of the normalized rubber increases progressively as the percent cis-1,4 structure increases, this property being best with cis-polybutadiene rubbers of at least 97% cis-1,4 structure.

As used herein, "Mooney viscosity" is determined by the standard procedure identified as ASTM D927–55T. When the Mooney viscosity of a raw rubber, or a normalized form thereof not containing carbon black is intended, it is to be understood that the value is the four minute value taken at 212° F. with the large (1.5 inch) rotor (ML–4–212° F.). When the Mooney viscosity of a compounded rubber composition containing carbon black is intended, it is to be understood that it is the 10 minute value taken at 212° F. with the large rotor (ML–10–212° F.).

The invention will now be more fully described with reference to specific examples which are illustrative only of the invention and not limiting thereof.

Example 1

In this example, a gel-free cis-polybutadiene rubber in which at least 97% of the butadiene units are present in the cis-1,4 structure is normalized by adding to the raw rubber a conventionally-refined, relatively-paraffinic hydrocarbon oil derived from Mid-Continent crudes and having a V.G.C. of 0.845. The raw rubber has a Mooney viscosity of 62 (ML–4–212° F.). Such a rubber is prepared by polymerizing monomeric butadiene-1,3 at about 10° C. in a mixture of butene-1 and benzene utilizing a soluble catalyst made by combining cobalt octoate with a mixture of diethyl aluminum chloride and ethyl aluminum dichloride. The polymerization is conducted under reflux at a pressure below 100 lbs./sq. in. and carried to essentially complete conversion. The polymerization mixture is treated with acetone (under nitrogen) to kill the catalyst, antioxidant dispersed in acetone added thereto, and the resulting mixture dispersed in hot water to flash off the solvents and residual monomer and convert the rubber to a slurry of fine crumbs in water. The crumbs are washed with water and then dried to obtain a dried rubber containing less than 0.05%/wt. of ash.

The dried cis-polybutadiene rubber is cut up or shredded and mixed in an open container with 8 phr. of the above-mentioned paraffinic petroleum oil and 3 phr. of a red-colored liquid rubber tackifier known as "Aromatic Plasticizer 25" and identified as being made up of polymerized alkylated aromatic hydrocarbons (sp. grav. 0.94–0.96; melting point 70–85° F.). The container and its contents are allowed to stand for 24 hours at 150° F., after which it is observed that the rubber has taken up the oils and is swollen thereby. The oil-swollen rubber is then transferred to a cool rubber mill to mass the rubber, insure homogeneity and convert it to sheet form. The oil-swollen rubber mills smoothly on the cool mill, adheres nicely to one of the rolls, and forms a good rolling bank. The milled sheets thus obtained are a normalized cis-polybutadiene rubber of this invention having a normalized Mooney viscosity of 43 (ML–4–212° F.).

The thus-prepared normalized cis-polybutadiene rubber is charged to a laboratory size Banbury mixer which has been preheated to 250–285° F. along with stearic acid, zinc oxide and all of the carbon black to be utilized. The mixer is then operated for 3 to 5 minutes while observing a recording power meter installed in the power supply line to the Banbury mixer drive motor. It will be noted that the power consumed in the mixer rises sharply indicating that excellent mixing is being obtained and the rubber is behaving in a "normal" fashion. This corresponds to "Step #3" of the process shown in FIG. 1 of the drawings. When the curve of power consumed flattens out after 3 to 5 minutes of mixing, dispersion of the carbon black is complete and the mixer is opened and the mix dumped after measuring the temperature thereof. There is no sign of free (undispersed) carbon black in the mixer or in the mix during dumping of the charge. This completes the preparation of a "Step #3 mix," as indicated in FIG. 1.

The materials utilized in these experiments are as follows:

STEP 3 MIX

| Experiment No | A | B | C | D | E | F |
|---|---|---|---|---|---|---|
| Normalized Rubber, parts/wt | 111 | 111 | 111 | 111 | 111 | 111 |
| HAF [1] Carbon black, phr | 50 | 60 | 70 | | | |
| FEF [2] Carbon black, phr | | | | 50 | 60 | 70 |
| Time (min.) for incorporation of black | 3¾ | 4¾ | 5 | 4¼ | 4 | 4 |
| Temp. of stock before dumping, ° F | 265 | 290 | 311 | 278 | 283 | 298 |

[1] Oil absorption value, 14.5 gals./100 lbs.
[2] Oil absorption value, 15.5 gals./100 lbs.

The normalized black-containing composition in each of the above experiments is transferred to a cool rubber mill and 1 phr. of ground sulfur and 1 phr. of "Santocure" accelerator (N - cyclohexyl - 2 - benzothiazylsulfenamide) are milled in and the resulting smooth-milling mixture sheeted off. The Mooney viscosity of the raw rubber, of the normalized rubber, and of the final compounded vulcanizable tread stock composition are compared below:

MOONEY (ML) VISCOSITY

| | ½ Min. | 4 Min. | 10 Min. |
|---|---|---|---|
| Raw Rubber | 74 | 62 | 53 |
| Normalized Rubber | 56 | 43 | 39 |
| Compounded Batch A | 100 | 74 | 68 |
| Compounded Batch B | 122 | 88 | 81 |
| Compounded Batch C | 141 | 104 | 96 |
| Compounded Batch D | 82 | 66 | 41 |
| Compounded Batch E | 91 | 74 | 67 |
| Compounded Batch F | 112 | 88 | 83 |

The Mooney viscosity data show that the "FEF" carbon black has a definite advantage over the lower structure "HAF" as regards processing quality. It will be noted that the Mooney rise after black incorporation is less than the "FEF" black than with the "HAF" variety. With the former, compounded Mooney viscosities of 41–68 with up to 60 phr. of "FEF" are in a range for very good processing quality. Such viscosities, however, are obtained only with 50 phr. of "HAF."

Compositions "A" through "F" are vulcanized at 284° F. and the resulting vulcanizates tested by standard (ASTM) procedures, except where indicated. The data are as follows:

Photomicrographs taken on the above and many other compositions containing cis-polybutadiene rubbers and the high structure carbon blacks indicate that the latter are dispersed in normalized cis-polybutadiene rubber in a

TIRE TREAD COMPOSITIONS

| Composition No. | Time for Cure at 284° F. (Min.) | Stress Strain Room Temperature | | | Stress-Strain, 212° F. | | | Goodrich Flexometer Heat Rise, °F. | Percent Set | Dur. | Pico [2] Abrasion | Belt Flex.[3] |
|---|---|---|---|---|---|---|---|---|---|---|---|---|
| | | 300% Mod.[1] | Tensile [1] | Percent Elongation | 300% Mod.[1] | Tensile [1] | Percent Elongation | | | | | |
| A | 40 | 1,460 | 2,260 | 400 | -------- | 1,270 | 300 | 53 | 7.5 | 57 | 205 | 49 |
| B | 50 | 1,700 | 2,430 | 390 | -------- | 1,270 | 290 | 97 | 13 | 60 | 238 | 11 |
| C | 25 | 1,600 | 2,030 | 320 | -------- | 1,110 | 270 | 117 | 17.1 | 64 | 217 | 3 |
| D | 35 | 1,570 | 2,250 | 350 | -------- | 1,110 | 270 | 38 | 3.9 | 58 | 114 | 88.5 |
| E | 40 | 1,990 | 2,400 | 350 | -------- | 1,300 | 260 | 54 | 4.4 | 62 | 142 | 40.5 |
| F | 30 | 2,390 | 2,480 | 310 | -------- | 1,150 | 190 | 74 | 5.9 | 67 | 173 | 160 |

[1] Lbs./sq. in.
[2] See U.S. Patent 2,799,155.
[3] Hours to failure of a belt made of the rubber composition when run over a pulley system at standard speed.

The above data shows several very significant factors. One is that the carbon black was very well dispersed. A second is the quite low heat rise values and the high Pico abrasion values shown for all six compositions. The "HAF" black appears best for abrasion resistance. The modulus is quite high at the 70 phr. loading for the "FEF" black indicating that the optimum for this carbon black is 50–60 phr. At all carbon black loadings, however, the "FEF" black is better dispersed as is clearly indicated by the lower heat rise values, lower percent set values, and faster rates of cure. These same values are even further improved upon by the use of carbon blacks of still higher structure as will be shown in subsequent examples. Compositions A, D and E can be extruded quite satisfactorily indicating very good processing qualities.

*Example 2*

The normalized cis-polybutadiene rubber of Example 1 ("Step #2 mix") is Banbury mixed (by procedure of Ex. 1) with 50 phr. of each of a series of well-known low structure carbon blacks. The data given below shows the long cure times, poor tensile values, and low Pico abrasion values for the compositions containing low structure blacks. Compositions containing high structure carbon blacks are included for comparison.

manner similar to that observed in the usual rubber/black compositions. In the case of natural rubber and SBR, the compositions having the best properties show the carbon black to be finely and uniformly dispersed. In the cis-polybutadiene rubber compositions in which the carbon black has been incorporated by low temperature milling, the black appears to be distributed in swirls. This is a type of dispersion not seen in natural rubber or SBR. In the normalized compositions of this invention, prepared by hot mixing in a Banbury or similar internal type mixer, the carbon black appears to be quite uniformly and finely dispersed. The hot-mixed normalized compositions have the highly valuable properties of high abrasion resistance and low heat generation which may be associated with the type of dispersion obtained under the hot mixing conditions. However, normalized compositions mixed at lower temperatures also have excellent properties even though the dispersion of the black may not be of the same character as is obtained at the higher temperatures. It would apepar, therefore, that the usual methods of rating the quality of carbon black dispersions have to be employed with some caution when dealing with cis-polybutadiene rubbers.

TIRE TREAD COMPOSITIONS.—OPTIMUM

| Carbon Black | Oil Absorption, gals./ 100 lbs. | Cure Time at 284° F., min. | Tensile Strength- R.T., lbs./sq. in. | Pico Abrasion | Compared Mooney Viscosity ML-10, 212° F. |
|---|---|---|---|---|---|
| "MT" | 4.0 | 80 | 390 | 7 | 38 |
| "FT" | 5.0 | 45 | 670 | 29 | 38 |
| "SRF" | 6.0 | 50 | 1,010 | 57 | 43 |
| "HMF" | 7.0 | 55 | 1,510 | 61 | 46 |
| "FF" | 9.5 | 40 | 1,460 | 83 | 51 |
| "EPC" | 11.0 | 65 | 1,550 | 101 | 60 |
| "HAF" | 14.5 | 40 | 2,260 | 205 | 63 |
| "ISAF" | 15.0 | 40 | 2,180 | 181 | 63 |
| "HR419" | 16.9 | 31 | 2,380 | 321 | 65 |

The above data clearly indicates that a high structure carbon black having an oil absorption value of at least about 13 gallons/100 lbs. exerts a very beneficial effect on the processing quality of a cis-polybutadiene rubber. Such carbon blacks seem to reduce the "nerve" of these rubbers whereas the carbon blacks of lower structure produce compositions not only of poor properties but also of poor extrusion and calendering quality. The compositions containing the low structure blacks are slow to cure.

*Example 3*

In this example, a number of portions of another gel-free cis-polybutadiene rubber having a Mooney viscosity of 52 are normalized and compounded in a Banbury mixer by the method shown in the block diagram of FIG. 1 of the drawings. The normalizing agents employed are those of Example 1. The proportions of the relatively paraffinic oil are varied while the tackifier oil is held constant at 3 phr. The materials utilized in a tire tread type recipe are as follows:

Flexometer Temp. Rise and compounded Mooney viscosity values are in best balance.

STEP 2 MIX

| Sample No. | A | B | C | D | E |
|---|---|---|---|---|---|
| Cis-polybutadiene rubber, parts/wt | 100 | 100 | 100 | 100 | 100 |
| Paraffin Oil [1], phr | | 7 | 17 | 27 | 37 |
| Tackifier [1], phr | | 3 | 3 | 3 | 3 |

STEP 3 MIX

| | | | | | |
|---|---|---|---|---|---|
| Stearic acid, phr | 3 | 3 | 3 | 3 | 3 |
| Zinc oxide, phr | 5 | 5 | 5 | 5 | 5 |
| Carbon black (ISAF), phr | 60 | 60 | 60 | 60 | 60 |
| Dump Temp., °F | 333 | 289 | 256 | 253 | 238 |
| Time for black incorporation, min | 8¼ | 3½ | 3¼ | 3½ | 3 |

STEP 4 MIX

| | | | | | |
|---|---|---|---|---|---|
| "Santocure" | 1 | 1 | 1 | 1 | 1 |
| Sulfur | 2 | 2 | 2 | 2 | 2 |

[1] Same as Example 1.

MOONEY VISCOSITY (ML–212° F.)

| | ½′ | 4′ | 10′ |
|---|---|---|---|
| Raw Rubber | 68 | 52 | 48 |
| Step #2 Mix B | 52 | 38 | 33 |
| Step #2 Mix C | 39 | 29 | 25 |
| Step #2 Mix D | 30 | 22 | 19 |
| Step #2 Mix E | 3 | 18 | 15 |
| Step #4 Mix A | Over 200, too tough to test. | | |
| Step #4 Mix B | 120 | 77 | 69 |
| Step #4 Mix C | 102 | 63 | 56 |
| Step #4 Mix D | 62 | 42 | 38 |
| Step #4 Mix E | 52 | 36 | 33 |

*Example 4*

In this example, a series of experiments similar to those of Example 3 are conducted utilizing a gel-free cis-polybutadiene rubber (at least 97% cis-1,4) having a raw polymer Mooney viscosity of 88. This rubber is made by a variation of the process described in Example 1. The materials, procedure and conditions utilized in the processing of this rubber are similar to those of Example 3, as follows:

Step #2 Mix

| Experiment No. | A | B | C | D | E |
|---|---|---|---|---|---|
| Cis-polybutadiene rubber parts/wt | 100 | 100 | 100 | 100 | 100 |
| Paraffin oil [1], phr | | 7 | 17 | 27 | 37 |
| Tackifier [1], phr | | 3 | 3 | 3 | 3 |

Step #3 Mix

| | | | | | |
|---|---|---|---|---|---|
| Stearic acid, phr | 3 | 3 | 3 | 3 | 3 |
| Zinc oxide, phr | 5 | 5 | 5 | 5 | 5 |
| HAF, phr | 60 | 60 | 60 | 60 | 60 |
| Dump temp., °F | 345 | 320 | 294 | 293 | 261 |
| Time for black incorp. (min.) | 13½ | 7 | 6¼ | 4½ | 4½ |

Step #4 Mix

| | | | | | |
|---|---|---|---|---|---|
| "Santocure," phr | 1 | 1 | 1 | 1 | 1 |
| Sulfur, phr | 2 | 2 | 2 | 2 | 2 |

[1] Same as Example 1.

The physical properties of the vulcanizates obtained from the above compositions are presented in a graphical manner in FIG. 6 of the drawings. Especially notable is the increase in optimum cure time that occurs beyond the 20 phr. level of normalizing agents. It should also be noted that the Pico abrasion values fall rapidly beyond the 20 phr. level while the Flexometer values fall slowly until the latter level, then rise steeply beyond. Likewise, the room temperature and 212° F. tensile strength and 300% modulus (R.T.) are improved up to 10–15 phr. of the normalizing agents. From these data, it appears that physical properties are "flat" up to about 20 phr. of these normalizing agents with rubber of this Mooney value and that optimum proportions are in the range of 5–15 phr. where the Pico abrasion, tensile, Durometer Hardness, The Mooney viscosity of each of the compositions at each stage of the process is as follows:

MOONEY VISCOSITY (ML, 212° F.)

| | ½′ | 4′ | 10′ |
|---|---|---|---|
| Step #2, Exp. A | 87 | 88 | 85 |
| Step #2, Exp. B | 70 | 70 | 64 |
| Step #2, Exp. C | 49 | 47 | 40 |
| Step #2, Exp. D | 40 | 38 | 30 |
| Step #2, Exp. E | 29 | 29 | 24 |
| Step #3, Exp. A | Over 200, too tough to test. | | |
| Step #3, Exp. B | 180 | 109 | 95 |
| Step #3, Exp. C | 123 | 76 | 64 |
| Step #3, Exp. D | 93 | 57 | 51 |
| Step #3, Exp. E | 94 | 46 | 41 |

Each of the above compositions is vulcanized at 284° F. The physical properties (at optimum cure) are shown in FIG. 7 of the drawings. It will be observed that the properties of the vulcanized, normalized rubber are relatively "flat" up to about 20 phr. of total normalizing agents. In the latter range, the time for optimum cure falls, the heat rise values decrease, the Durometer hardness is nearly constant, and the other properties are in good balance. It is especially to be noted that "Belt Flex" values (a measure of the flexibility in hours to failure) are quite good between 10 and 25 phr. of total normalizing agents. The compositions of this example, except those of experiments A and B, all process very easily. Particular notice should be paid to the abnormally large increase (85 to over 200) in Mooney viscosity suffered by the un-normalized composition (Experiment A) after the carbon black has been incorporated. Just 10 phr. of normalizing agents (7 phr. of oil, 3 of tackifier) reduced this same value to 95 and 20 phr. of these ingredients to 64 (in the good processing range).

*Example 5*

The procedure of Examples 3 and 4 is repeated utilizing a very tough, gel-free cis-polybutadiene rubber having a cis-1,4 content of at least 97% and a Mooney viscosity of 109. This rubber is also made by a variation of the polymerization process described in Example 1. The data is as follows:

STEP #2 MIX

| Experiment No. | A | B | C | D | E |
|---|---|---|---|---|---|
| Cis-polybutadiene rubber (109 ML) parts/wt. | 100 | 100 | 100 | 100 | 100 |
| Paraffin oil,[1] phr. | | 7 | 17 | 27 | 37 |
| Tackifier,[1] phr. | | 3 | 3 | 3 | 3 |

STEP #3 MIX

| | | | | | |
|---|---|---|---|---|---|
| HAF, phr. | 60 | 60 | 60 | 60 | 60 |
| Zinc oxide, phr. | 5 | 5 | 5 | 5 | 5 |
| Stearic acid, phr. | 3 | 3 | 3 | 3 | 3 |
| Dump Temp., °F. | 288 | 328 | 304 | 300 | 273 |
| Time for black incorp. (min.) | 14½ | 10½ | 7½ | 5½ | 5 |

[1] Same as in Example 1.

MOONEY VISCOSITY (ML, 212° F.)

| | ½[1] | 4[1] | 10[1] |
|---|---|---|---|
| Step #2, Exp. A | 109 | 109 | 109 |
| Step #2, Exp. B | 90 | 84 | 74 |
| Step #2, Exp. C | 74 | 68 | 59 |
| Step #2, Exp. D | 55 | 51 | 43 |
| Step #2, Exp. E | 46 | 43 | 35 |
| Step #3, Exp. A | Over 200, too tough to test. | | |
| Step #3, Exp. B | 170 | 106 | 94 |
| Step #3, Exp. C | 126 | 80 | 71 |
| Step #3, Exp. D | 100 | 62 | 54 |

The physical properties of the vulcanizates produced from the above mixtures are given in graphical form in FIG. 8 of the drawings. As in Example 4, the properties are relatively "flat" up to about 15 to 20 phr. of total normalizing agents and quite good up to about 25 phr. The time for optimum cure is reduced to a reasonable value and the Pico Abrasion values, the Goodrich Flexometer heat rise values, the tensile strength values and the modulus values are reasonable in the range of 10 to 25 phr. of total normalizing agents. The use of (1) a fatty acid, (2) sufficient paraffin oil to a total of 15–20 phr., and (3) the highest structure carbon blacks would seem to be indicated for the tougher polymers such as are utilized in this example.

*Example 6*

For the purpose of comparing the results with those of the preceding examples, a gel-free cis-polybutadiene rubber made by a variation of the process of Example 1 having at least 97% of its butadiene units joined cis-1,4 and a Mooney viscosity of about 75 is processed by the conventional Banbury mixing procedure of first-black-and-then-oil (see FIG. 2 of drawings). The oil utilized is a relatively aromatic oil known as "Sundex 53" having a Viscosity-Gravity Constant of about 0.936. The recipe utilized is similar, except for the oil, to that utilized in Examples 1 to 5. The physical properties of the optimum vulcanizates (cured at 284° F.) obtained from the resulting compositions are shown in FIG. 12 of the drawings. Note that the tensile strength does not rise; the "BFG Flexometer Heat Rise" values and optimum cure times go up directly with increasing aromatic oil content; and the Pico Abrasion values drop precipitately with increasing oil addition. It is obvious that an aromatic oil added after the black does not "normalize" the cis-polybutadiene rubbers and wreaks havoc on the very properties which make these rubbers so important in tire treads. The power consumption curve for the 97% cis-1,4 polybutadiene in FIG. 2 represents the poor processing quality of the mixtures just described.

The power consumption curve of FIG. 2 labelled "93% cis-1,4 polybutadiene" represents the even poorer processing characteristics by the first-black-then-oil technique of a rubber of less regular structure made with $R_3Al/$ titanium tetraiodide catalysts. Such a rubber exhibits a most undesirable characteristic (in the first-black-then-oil procedure) of becoming progressively tougher during processing. This makes this type of rubber much more difficult to process by ordinary techniques than the higher cis-1,4 cobalt-polymerized rubbers. When normalized, however, the iodide-catalyzed polybutadiene (93% cis) rubber does not show this characteristic increase in toughness during processing, as will be seen in Example 10, below.

*Example 7*

In this example, a close comparison of the normalizing process with the first-black-then-oil procedure is obtained by preparing in a Banbury mixer a series of compositions all containing 20 phr. of a hydrocarbon oil; a portion of the oil being added before, and the remainder after, the addition of carbon black. These compositions are then compared with two controls: one in which all of the 20 phr. of oil is added before; and the other in which all of the 20 phr. of oil is added after the black. In this way trends can be observed at identical oil loadings. In this example, three such series of experiments are conducted; one utilizing the paraffin oil of Examples 1–5 (VGC 0.845); another utilizing a naphthenic oil known as "Gulf 566" (VGC 0.864), and the third the aromatic oil of Example 6 (VGC 0.936). The general recipe utlized in all compositions is as follows:

| Material: | Parts/wt. |
|---|---|
| Rubber | 100 |
| Oil | 20 |
| HAF | 68 |
| Zinc oxide | 5 |

| Material: | Parts/wt. |
|---|---|
| Stearic acid | 3 |
| Sulfur | 1 |
| "Santocure" | 1 |
| Cure temperature, 284° F. | |

The physical properties of the compositions made with the paraffin oil are shown in FIG. 9; those made with the naphthenic oil in FIG. 10; and those made with the aromatic oil in FIG. 11.

The most significant observation one makes upon comparing the curves of FIGS. 9–11 is the horizontal spread of the data, or the variation in "Batch Stock" Mooney viscosity induced by each of the oils. It is clear that 20 phr. of the paraffin oil produces a spread of about 25 points in Mooney viscosity; the naphthenic oil a spread of about 15 points; and the aromatic oil a spread of only about 10 points. These quantities are in about the same order of magnitude as the degree of swell of cis-polybutadiene rubber in these same oils.

It should also be noted that the paraffinic and naphthenic oils produce normalized vulcanizates having very materially higher Pico Abrasion index values and lower "BFG Flexometer Temperature Rise" values than does the aromatic oil. Similarly, the hot tensile strength (tensile, 212° F.) values of FIG. 9 are better than those of FIG. 11. Thus, the aromatic oils do not normalize the vulcanizing behavior of the cis-polybutadiene rubbers to an appreciable extent and are less efficient in reducing the Mooney rise upon black incorporation than are paraffinic and naphthenic oils. These results are confirmed by the normalized compositions of FIGS. 9 and 10 exhibiting better processing qualities than those of FIG. 11.

The strong peaking of the data for the paraffinic and naphthenic oils in the range of about 5–10 phr. of the oil (in a rubber of 55 Mooney viscosity) is again demonstrated in FIGS. 9 and 10. Also, most of the properties are increasingly impaired as more of the oil is added after the carbon black.

*Example 8*

In this example, a number of tackifying oils are tested as auxiliary normalizing agents along with the paraffin oil of Example 1. The rubber employed as a gel-free cis-polybutadiene rubber (ca 97% cis-1,4) having a Mooney viscosity of 55. The mixing procedure utilized is that of FIG. 1 wherein the raw rubber is charged to a laboratory-size Banbury preheated to at least 250° F. and the mixer operated with the ram down for one minute to warm up the rubber (Step #2, FIG. 1). The mixer is then opened and a mixture of tackifier and paraffin oil preheated to 250° F. is added. The resulting mixture is masticated (Step #2, FIG. 1) while observing a recording power meter installed in the mixer drive motor power supply line. It will be observed that the power consumed in the mixer rises sharply above the level achieved during the warm-up cycle showing that the rubber/oil mixture is much more workable and actually "tougher" than the raw rubber. The curve of power consumption vs. time of mixing will be observed to level off or reach a plateau and then decline slightly. When the curve has passed such a plateau the normalizing ingredients are well dispersed and mix can be dumped and allowed to stand at room temperature for about 24 hours. The product at this point is a normalized composition of this invention.

After the 24 hour "aging" period is over, the normalized composition is returned to the preheated Banbury and pre-masticated 1 minute. Then the mixer is opened and all of the powdery, solid ingredients, including carbon black (excepting sulfur and accelerators) are added. These ingredients are added all at once and mastication is resumed (Step #3). The power curve will show that the power consumed in the Banbury mixer rises precipitately to another plateau (point "M," FIG. 4a) then levels off at a value very materially higher than that attained in the Step #2 normalizing cycle. In three to five minutes of mixing, the power curve will have passed the plateau and the Step #3 mix is completed. Upon opening the mixer there is no sign of undispersed black and the mix has a shiny black appearance.

The sulfur and accelerator then are added and the mixer operated for one minute; the mix (Step #4 mix) dumped out on a cool sheet-out mill; and the mix is milled to sheet form. The materials utilized are as follows:

STEP #2 MIX

| Experiment No. | A | B | C | D | E | F | G | H | I |
|---|---|---|---|---|---|---|---|---|---|
| Cis-polybutadiene rubber-parts/wt | 100 | 100 | 100 | 100 | 100 | 100 | 100 | 100 | 100 |
| Tackifier Oil #1,[1] phr | 3 | 3 | 3 | 3 | 3 | 3 | 3 | 3 | 3 |
| Tackifier Oil # 2,[2] phr | 3 | 3 | 3 | 3 | 3 | 3 | 3 | 3 | 3 |
| Paraffin Oil, phr | | | | 3 | 3 | 3 | 3 | 6 | 6 |

STEP #3 MIX

| HAF carbon black, phr | 45 | 55 | 65 | 45 | 55 | 65 | 45 | 55 | 65 |
|---|---|---|---|---|---|---|---|---|---|
| Zinc oxide, phr | 5 | 5 | 5 | 5 | 5 | 5 | 5 | 5 | 5 |

STEP #4 MIX

| "Santocure", phr | 1.5 | 1.5 | 1.5 | 1.5 | 1.5 | 1.5 | 1.5 | 1.5 | 1.5 |
|---|---|---|---|---|---|---|---|---|---|
| Sulfur, phr | 1.5 | 1.5 | 1.5 | 1.5 | 1.5 | 1.5 | 1.5 | 1.5 | 1.5 |
| Compounded Stock Mooney viscosity (ML-10-212° F.) | 59 | 75 | 96 | 55 | 65 | 82 | 50 | 59 | 77 |

[1] An octyl phenol/formaldehyde condensate known as "Catalin 8318".
[2] Crude lauric acid containing oleic acid.

The above compositions, vulcanized to optimum cure at 284° F., have the following properties:

| Sample No. | Time for Opt. Cure (Min.) | Stress-Strain, Room Temp. | | | Stress-Strain, 212° F. | | | Heat Rise, ° F. Goodrich Flexometer | Percent Perm. Set | Dur. | Pico Abrasion index | Garvey Die Extrusion Rate, Gms./min. | Surface Finish and Quality of Extrusion |
|---|---|---|---|---|---|---|---|---|---|---|---|---|---|
| | | 300% Mod., Lbs./sq. in. | Tensile Strength, Lbs./sq. in. | Percent Elong. | 300% Mod. | Tensile Strength | Percent Elong. | | | | | | |
| A | 26 | 1,660 | 1,890 | 360 | -------- | 980 | 250 | 35 | 4.7 | 61 | 154 | 67.45 | Rough, torn edges. |
| B | 20 | 2,350 | 2,590 | 310 | -------- | 1,340 | 220 | 45 | 5.0 | 67 | 340 | 57.14 | Do. |
| C | 23 | -------- | 2,290 | 260 | -------- | 1,240 | 200 | 83 | 8.5 | 68 | 354 | 53.00 | Do. |
| D | 26 | -------- | 1,700 | 280 | -------- | 790 | 180 | 29 | 3.2 | 62 | 180 | 75.90 | Smooth, no torn edges. |
| E | 25 | 2,240 | 2,430 | 310 | -------- | 1,190 | 220 | 46 | 5.2 | 65 | 316 | 74.90 | Do. |
| F | 33 | -------- | 2,090 | 280 | -------- | 1,110 | 220 | 100 | 15.0 | 65 | 259 | 60.98 | Smooth, few torn edges. |
| G | 36 | 1,600 | 1,810 | 310 | -------- | 870 | 220 | 29 | 3.3 | 60 | 152 | 82.34 | Smooth, no torn edges. |
| H | 19 | 1,860 | 2,330 | 360 | -------- | 1,230 | 300 | 50 | 8.5 | 60 | 247 | 81.37 | Do. |
| I | 20 | -------- | 1,980 | 250 | -------- | 1,210 | 220 | 65 | 7.4 | 67 | 310 | 63.00 | Smooth edges, somewhat rough. |

When data in Experiments A, B and C are compared to that of the remaining experiments, it is seen that the hydrocarbon oil is essential. Note the great improvement achieved when only 3 phr. of the oil is used. Good processing qualities, as shown by the character of the Garvey Die extrudates, are not obtained without it. Tackifiers #1 and #2 are shown in these data to be of considerable value in improving processing qualities and reducing Mooney rise upon black incorporation. All of compositions D through I are easily extruded in the form of tire treads and similar articles. These data indicate that about 55 phr. of high structure carbon black is about optimum in tire tread applications. The above data also indicate that about 45 phr. of these same carbon blacks is about optimum for a tire carcass compound.

*Example 9*

The data plotted in FIGS. 4a–4b of the drawings are obtained from the experiments of this example. In these experiments crude lauric acid, and the tackifier and the paraffin hydrocarbon oil of Example 1, are incorporated in a cobalt-polymerized cis-polybutadiene rubber (97% cis-1,4; 55 ML–4–212° F.) by different orders-of-addition further to illustrate the importance of first normalizing the rubber before adding the carbon black. The materials utilized are as follows:

STEP #2 MIX

| Experiment No. | A | B | C | D |
|---|---|---|---|---|
| Cis-polybutadiene rubber, parts/wt. | 100 | 100 | 100 | 100 |
| Lauric acid, phr. | ¹3 | ²3 | ³3 | 3 |
| Paraffin oil, phr. | ¹6 | ²6 | ³6 | 6 |
| Tackifier, phr. | ---- | ---- | ---- | ⁴3 |

¹ Added 24 hours before black.
² Add just before black.
³ Add just after black.
⁴ Add with black, add oils and acid after black.

STEP #3 MIX

| Experiment No. | A | B | C | D |
|---|---|---|---|---|
| Antioxidant ¹ | 1 | 1 | 1 | 1 |
| Zinc oxide, phr. | 5 | 5 | 5 | 5 |
| ISAF, phr. | 55 | 55 | 55 | 55 |
| Time for black incorp. (min.) | 3½ | 4 | 8 | 15+ |

¹ A non-staining product of diphenylamine and acetone.

STEP #4 MIX

| Experiment No. | A | B | C | D |
|---|---|---|---|---|
| "Santocure", phr. | 1.5 | 1.5 | 1.5 | 1.5 |
| Sulfur, phr. | 1.5 | 1.5 | 1.5 | 1.5 |

MOONEY VISCOSITY (ML, 212° F.)

| | ½′ | 4′ | 10′ | Mooney Rise |
|---|---|---|---|---|
| Raw rubber | 66 | 54 | 48 | -------- |
| Step #2 Mix (normalized), A | 47 | 38 | 34 | −14 |
| Step #4 Mix, A | 85 | 73 | 69 | +15 |
| Step #4 Mix, B | 92 | 78 | 75 | +21 |
| Step #4 Mix, C | 91 | 80 | 78 | +24 |
| Step #4 Mix, D | 98 | 86 | 82 | +28 |

It is clear that to reduce the Mooney rise on black incorporation and for acceptable processing qualities the paraffin oil must be added before the carbon black Addition of these materials just before black does not produce the best processing quality but this procedure ("B," above) produced a composition of acceptable processing quality. Addition of the oil and tackifier simultaneously with or after the black did not do so. In this example, the crude lauric acid addition is shown to be exceedingly effective in holding the Mooney rise from 54 to 69 ("A," above) or 15 points, a very small rise on the incorporation of 55 phr. of high structure carbon black.

*Example 10*

In this example, a cis-polybutadiene rubber made with a soluble trialkyl aluminum/Ti I4 catalyst in which about 93% of the butadiene units are united cis-1,4 and having a raw polymer Mooney viscosity of 43, is utilized. The very poor processing behavior of this rubber using the first-black-then-oil technique is shown in the bottom curve of FIG. 2. Despite its lower Mooney viscosity, this rubber is materially more difficult to process than rubbers higher in cis-1,4 content. The lower cis-1,4 polybutadiene rubbers of this type can, however, be processed alone by the normalizing procedure of this invention. In one experiment (A) this 93% cis rubber is normalized with 8 phr. of the relatively paraffinic oil and 3 phr. of the tackifier of Example 1. In a second experiment (B), neither the tackifier nor the normalizing oil are utilized. The Mooney viscosity of the raw rubber and of the compounded stocks are given below:

MOONEY VISCOSITY (ML, 212° F.)

|  | ½′ | 4′ | 10′ | Mooney Rise |
|---|---|---|---|---|
| Raw Rubber | 48 | 43 | 41 | |
| Normalized,[1] Exp. A | 38 | 32 | 31 | −12 |
| Non-normalized [1] Exp. B | 110 | 86 | 82 | +39 |

[1] Containing 60 phr ISAF carbon black.

The materially lower Mooney of 31 of the normalized composition as compared to 82 for the non-normalized composition clearly shows the improvement in processing quality brought about by the normalizing process in this ordinarily difficult-to-process rubber.

*Example 11*

In this example, a cis-polybutadiene rubber of at least 97% cis-1,4 structure and 55 Mooney viscosity (ML-4-212° F.) is normalized, compounded for tire treads and extruded in the form of treads for the largest 10.00 x 20 heavy duty truck and bus tires. The procedure employed is as follows:

| Step #2 Mix | ML, 212° F. | | |
|---|---|---|---|
|  | ½′ | 4′ | 10′ |
| Cis-polybutadiene rubber, parts/wt. 100 Tackifier of Ex. 1, 3 phr Paraffin oil of Ex. 1, 8 phr | 51 | 40 | 34 |
| Step #3 Mix: HAF, phr 60 Stearic acid, 3 phr Zinc oxide, 5 phr | 118 | 78 | 72 |
| Step #4 Mix: "Santocure," 1.1 phr Sulfur, 1.9 phr | 91 | 72 | 68 |
| Control (Hevea) | 69 | 58 | 56 |

Processing quality, control and cis-polybutadiene composition, very smooth.

Garvey Die Extrusions at 235° F.: Wt. (Gms.)
   Cis-polybutadiene rubber composition _____ 83.83
   Hevea control _____ 67.58

From the above data, it is apparent that the tire tread stock extruded as well as, or better than, a control tire tread stock made from natural rubber. Laboratory tests show the control and experimental compositions to have the following properties:

The experimental and control compositions are extruded as treads and the treads applied to green (unvulcanized) standard production 10.00 x 20 truck and bus tires having natural rubber carcasses and the tires then given a standard vulcanization cycle. The resulting tires were road tested with the following results; in all cases the control being rated at a tread wear index of 100:

| Tire mileage: | Experimental tire tread wear index |
|---|---|
| 3,000 | 132 |
| 6,400 | 154 |
| 9,200 | 158 |
| 12,800 | 162 |
| 17,000 | 165 |
| 19,000* | 166 |

*Test continued, no failures of experimental tires.

The above experimental tire tread composition is extruded in the form of tire treads for a standard production passenger car tire (8.50 x 14) having an SBR/nylon carcass. The resulting tires were run in Texas against all-SBR control tires. The tire tread wear indices (control=100) are tested below:

| Miles: | Index |
|---|---|
| 7,200 | 86.4 |
| 9,000 | 135.3 |
| 10,755 | 193.1 |
| 12,555 | 240.2 |
| 14,355 | 321.1 |

In both cases the tire treads of 100% cis-polybutadiene rubber evidence the unusual characteristic of performing progressively better as the mileage increases. In no case, in the truck and passenger tires, was there any evidence of tread separation. Tread cracking was materially better than the controls. The tires of this invention were of very materially better quality than the natural rubber and SBR control tires in all-around performance.

*Example 12*

The strong effect of fatty acid on the abrasion resistance and Heat Rise properties of tire tread vulcanizates made from 55 ML cis-polybutadiene rubber (97% cis) with 60 phr. ISAF carbon black is demonstrated in this example. The procedure is a high temperature Banbury mixing process similar to that of FIG. 1 and the recipe is that of FIG. 1. In all of the compositions of this example, the normalizing agents are 8 phr. of the relatively paraffinic oil of Example 1 and 3 phr. of the octyl phenol/formaldehyde condensate ("Catalin 8318") of Example 8. The data are as follows:

| Parts/weight Stearic Acid | Pico Abrasion Index | Goodrich Flexometer Heat Rise, °F. |
|---|---|---|
| 0.0 | 13 | >140 |
| 0.5 | 34 | 135 |
| 1.5 | 81 | 110 |
| 3.0 | 190 | 95 |
| 4.0 | 224 | 60 |
| 5.0 | 225 | 47 |
| 10.0 | 223 | 35 |

| Composition | Time for Opt. Cure (Mins.) | Stress-Strain R.T. | | | Stress-Strain, 212° F. | | | Heat Rise, A, °F. Goodrich Flexometer | Percent Set | Dur. Hard. | Pico Abrasion Index | Gehman T5, °C. | Air Diffusion |
|---|---|---|---|---|---|---|---|---|---|---|---|---|---|
|  |  | 300% Mod. | Tensile Strength | Percent Elong. | 300% Mod. | Tensile Strength | Percent Elong. |  |  |  |  |  |  |
| Hevea Control | 45 | 1,010 | 4,070 | 600 | 690 | 2,330 | 710 | 35 | 16.3 | 54 | 81 | −47.5 | .005 .137 |
| Experimental | 35 | 1,690 | 2,290 | 380 | | 1,230 | 290 | 68 | 10.7 | 60 | 231 | −25 | .004 .571 |

*Example 13*

In this example, a highly refined paraffinic hydrocarbon oil having a V.G.C. of 0.835 is employed in the procedure of FIG. 1 whereby a 55 ML cis-polybutadiene rubber is normalized with 10 phr. of the oil and then mixed with the remainder of the ingredients including 60 phr. of ISAF carbon black. The Mooney viscosity of the normalized rubber is 38 and the Mooney viscosity of the vulcanizable tire tread composition is 69. The latter composition extrudes smoothly through a Garvey die at good rates forming extrudates of exceptionally smooth surface and smooth, continuous edges.

*Example 14*

In this example, several auxiliary normalizing agents are evaluated by comparing their effects on the time for incorporating 68 phr. of "HAF" carbon black in a rubber similar to that of the preceding example. These agents are: (1) a p-coumarone-indene resinous tackifier known as "Cumar RH"; (2) "K" gum rosin; and (3) benzoic acid. The power consumption curves for these compositions are superimposed and shown in FIG. 5 of the drawings. It is apparent that benzoic acid is the most efficient of the materials tested in shortening the time required for carbon black incorporation. "K" gum rosin is almost as good and the coumarone-indene resin least effective although of some assistance. The physical properties of the vulcanizates reflect the ease of carbon black incorporation. For example, the time for optimum cure is acceptable with both the rosin and benzoic acid additives. With the coumarone-indene resin, the cure time is somewhat less than the control showing some benefit from the use of this material. However, the Goodrich Flexometer heat rise values and Pico Abrasion indices are not acceptable with the coumarone-indene resin so that the latter is not recommended in tire compounds although it can be utilized in non-tire applications where these properties are not essential. Both "K" gum rosin and benzoic acid produce fast-curing vulcanizates having low heat generation on flexing and high abrasion resistance.

We claim:

1. A process of preparing a plastic rubber composition of normalized processing behavior comprising combining a rubbery homopolymer of butadiene-1,3 in which at least about 80% of the butadiene units are joined cis-1,4, and characterized by a four-minute ML Mooney viscosity at 212° F. in the range of 35 to 120, with (1) from about 1 to about 25 parts by weight per 100 parts by weight of said rubbery homopolymer of a normalizing hydrocarbon oil having a Viscosity-Gravity-Constant above about 0.79 and below about 1.0; (2) from about 0.5 to about 10 parts by weight per 100 parts by weight of rubbery homopolymer of a fatty acid; and (3) from about 0.5 to about 15 parts by weight per 100 parts by weight of rubbery homopolymer of a rubber tackifying agent, said components (1) through (3) totalling not more than about 25 parts by weight per 100 parts by weight of said rubbery homopolymer.

2. A process for preparing a vulcanized rubbery homopolymer of butadiene-1,3 comprising combining a vulcanizing agent with a plastic rubber composition of normalized processing behavior prepared by combining a rubbery homopolymer of butadiene-1,3 in which at least about 80% of the butadiene units are joined cis-1,4 and characterized by a four-minute ML Mooney viscosity at 212° F. in the range of 35 to 120, with (1) from about 1 to about 25 parts by weight per 100 parts by weight of said rubbery homopolymer of a normalizing hydrocarbon oil having a Viscosity - Gravity - Constant above about 0.79 and below about 1.0; (2) from about 0.5 to about 10 parts by weight per 100 parts by weight of rubbery homopolymer of a fatty acid; and (3) from about 0.5 to about 15 parts by weight per 100 parts by weight of rubbery homopolymer of a rubber tackifying agent, said components (1) through (3) totalling not more than about 25 parts by weight per 100 parts by weight of rubbery homopolymer, and thereafter vulcanizing the mixture.

3. A process of preparing a plastic rubber composition of normalized processing behavior comprising combining a rubbery homopolymer of butadiene-1,3 in which at least about 80% of the butadiene units are joined cis-1,4 and characterized by a four-minute ML Mooney viscosity at 212° F. in the range of 35 to 120, with; (1) from about 1 to about 25 parts by weight per 100 parts by weight of said rubbery homopolymer of a normalizing hydrocarbon oil having a Viscosity-Gravity-Constant of above about 0.79 and below about 1.0; (2) from about 0.5 to about 10 parts by weight per 100 parts by weight of rubbery homopolymer of a fatty acid; (3) from about 0.5 to about 15 parts by weight per 100 parts by weight of rubbery homopolymer of a rubber tackifying agent and (4) from about 25 to about 125 parts by weight per 100 parts by weight of rubbery homopolymer of carbon black, said components (1) through (3) totalling not more than about 25 parts by weight per 100 parts by weight of rubbery homopolymer.

4. A process of preparing a plastic rubber composition of normalized processing behavior comprising combining a swollen rubbery homopolymer of butadiene-1,3 in which at least about 80% of the butadiene units are joined cis-1,4 with from about 25 to about 125 parts by weight per 100 parts by weight of said rubbery homopolymer of carbon black, said rubbery homopolymer being characterized by a four-minute ML Mooney viscosity at 212° F. in the range of 35 to 120 and being combined with (1) from about 1 to about 25 parts by weight per 100 parts by weight of said rubbery homopolymer of a normalizing hydrocarbon oil having a Viscosity-Gravity-Constant above about 0.79 and below about 1.0; (2) from about 0.5 to about 10 parts by weight per 100 parts by weight of rubbery homopolymer of a fatty acid; and (3) from about 0.5 to about 15 parts by weight per 100 parts by weight of rubbery homopolymer of a rubber tackifying agent, said components (1) through (3) totalling not more than about 25 parts by weight per 100 parts by weight of rubbery homopolymer.

5. A high temperature method of Banbury mixing for the processing of a rubbery homopolymer of butadiene-1,3 in which at least about 80% of the butadiene units are joined cis-1,4 and characterized by a four-minute ML Mooney viscosity at 212° F. in the range of 35 to 120, which method comprises the steps carried out in the order recited of (1) masticating in a Banbury mixer a mixture of (a) said rubbery homopolymer; (b) from about 1 to about 25 parts by weight per 100 parts by weight of said rubbery homopolymer of a normalizing hydrocarbon oil having a Viscosity-Gravity-Constant above about 0.79 and below about 1.0; (c) from about 0.5 to about 10 parts by weight per 100 parts by weight of rubbery homopolymer of a fatty acid; and (d) from about 0.5 to about 15 parts by weight per 100 parts by weight of rubbery homopolymer of a rubber tackifying agent; said mastication being carried out at a temperature in the range of from about 150° to about 400° F.; (2) adding to the normalized mixture thereby produced from about 25 to about 125 parts of carbon black; (3) masticating the resulting mixture at a temperature of from about 150° to about 400° F.; and (4) thereafter mixing the black-containing mixture with a vulcanizing agent.

6. A vulcanizable plastic rubber composition of normalized processing behavior comprising a rubbery homopolymer of butadiene-1,3 in which at least about 80% of the butadiene units are joined cis-1,4 and characterized by a four-minute ML Mooney viscosity at 212° F. in the range of 35 to 120 which has been combined with (1) from about 1 to about 25 parts by weight per 100 parts by weight of said rubbery homopolymer of a normalizing hydrocarbon oil having a Viscosity-Gravity-Constant above about 0.79 and below about 1.0; (2) from about 0.5 to about 10 parts by weight per 100 parts by weight of rubbery homopolymer of a fatty acid; (3) from about 0.5 to about 15 parts by weight per 100 parts by weight of rubbery homopolymer of a rubber tackifying agent; (4) from about 25 to about 125 parts by weight per 100 parts by weight of said rubbery homopolymer of carbon black and (5) a vulcanizing agent, said components (1) through (3) totalling not more than about 25 parts by weight per 100 parts by weight of rubbery homopolymer.

References Cited by the Examiner

UNITED STATES PATENTS

| | | | |
|---|---|---|---|
| 1,942,853 | 1/1934 | Zimmerli et al. | 260—759 |
| 2,359,354 | 10/1944 | Campbell | 260—767 |
| 2,360,895 | 10/1944 | Sarbach | 260—31.4 |
| 2,523,926 | 9/1950 | Sperberg et al. | 260—759 |
| 2,698,280 | 12/1954 | Hersberger et al. | 260—33.5 |
| 2,721,185 | 10/1955 | Schulze et al. | 260—23.7 |
| 2,784,165 | 3/1957 | Howland | 260—33.5 |
| 2,900,357 | 8/1959 | Ayers et al. | 260—33.6 |
| 2,935,485 | 5/1960 | Reynolds | 260—33.6 |
| 2,953,556 | 9/1960 | Wolfe et al. | 260—94.7 |
| 3,004,018 | 10/1961 | Naylor | 260—94.3 |
| 3,081,276 | 3/1963 | Snyder et al. | 260—33.6 |

FOREIGN PATENTS

| | | |
|---|---|---|
| 597,053 | 4/1960 | Canada. |

OTHER REFERENCES

Barron, "Modern Rubber Chemistry" (1948), pp. 142–157.

Winspear, "The Vanderbilt Rubber Handbook" (1958), pp. 259, 455, 462 and 476.

Barron, "Modern Synthetic Rubber," 1949, pages 248 to 251.

Morton, "Introduction to Rubber Technology," 1959, pages 151 to 164, 237, 422 and 424.

"Compounding Ingredients for Rubber," 1947, page 267.

Dannenberg, Industrial and Engineering Chemistry, vol. 44, pages 813 to 818, 1952.

Kraus et al., The Rubber and Plastics Age, vol. 38, page 880, 1957.

Horne et al., Industrial and Engineering Chemistry, vol. 48, page 788, 1965.

Morton, Rubber Age, 72 (No. 4) 473–6 (1953).

Kraus et al., "Effect of Cis-Trans Ratio on the Physical Properties of 1,4-Polybutadiene," The Rubber and Plastics Age, October, 1957, vol. 38, pages 880–881.

LEON J. BERCOVITZ, *Primary Examiner.*

ALPHONSO SULLIVAN, *Examiner.*

T. D. KERWIN, R. A. WHITE, R. W. GRIFFIN,
*Assistant Examiners.*

UNITED STATES PATENT OFFICE
CERTIFICATE OF CORRECTION

Patent No. 3,264,237                                            August 2, 1966

Donald V. Sarbach et al.

It is hereby certified that error appears in the above numbered patent requiring correction and that the said Letters Patent should read as corrected below.

Column 18, line 45, for "apepar" read -- appear --; column 19, in the second table, second column, line 5 thereof, for "3" read -- 23 --; columns 21 and 22, in the second table, second column, line 5 thereof, for "14 1/2" read -- >14 1/2 --; column 21, in the third table, the headings to the second, third and fourth columns, for "1/2¹", "4¹" and "10¹" read -- 1/2´ --, -- 4´ --, and -- 10´ --; column 24, line 9, for "jaraffin" read -- paraffin --; columns 23 and 24, in the first table, eight column, line 4 thereof, for "3" read -- 6 --.

Signed and sealed this 28th day of November 1967.

(SEAL)
Attest:

EDWARD M. FLETCHER, JR.                          EDWARD J. BRENNER
Attesting Officer                                     Commissioner of Patents